United States Patent
Terasaka et al.

(10) Patent No.: US 8,930,107 B2
(45) Date of Patent: Jan. 6, 2015

(54) VEHICLE BRAKING CONTROL DEVICE AND VEHICLE BRAKING CONTROL METHOD

(75) Inventors: Masato Terasaka, Ichinomiya (JP); Yusuke Takeya, Miyoshi (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 13/985,229

(22) PCT Filed: Feb. 17, 2012

(86) PCT No.: PCT/JP2012/053807
§ 371 (c)(1),
(2), (4) Date: Aug. 13, 2013

(87) PCT Pub. No.: WO2012/111802
PCT Pub. Date: Aug. 23, 2012

(65) Prior Publication Data
US 2013/0325280 A1    Dec. 5, 2013

(30) Foreign Application Priority Data

Feb. 18, 2011    (JP) ................. 2011-034003

(51) Int. Cl.
*G06F 7/00*      (2006.01)
*B60T 8/18*      (2006.01)
*B60T 8/172*     (2006.01)
*B60T 8/1761*    (2006.01)
*B60T 8/32*      (2006.01)

(52) U.S. Cl.
CPC . *B60T 8/18* (2013.01); *B60T 8/172* (2013.01); *B60T 8/1761* (2013.01); *B60T 8/3275* (2013.01); *B60T 2201/03* (2013.01)

USPC ............ 701/70; 701/74; 303/22.1; 303/22.2; 303/160

(58) Field of Classification Search
USPC ................ 701/70, 78–79; 303/121, 138, 160, 303/22.1–22.2; 188/2 R
See application file for complete search history.

(56) References Cited

U.S. PATENT DOCUMENTS 5,267,162 A    11/1993   Ichikawa et al.
5,333,944 A *  8/1994    Shirai et al. ................... 303/177
(Continued)

FOREIGN PATENT DOCUMENTS

FR    2 890 356 A1    3/2007
JP    7-205784 A      8/1995
(Continued)

OTHER PUBLICATIONS

International Search Report (PCT/ISA/210) issued on May 29, 2012, by the Japanese Patent Office as the International Searching Authority for International Application No. PCT/EP2012/053807.

(Continued)

*Primary Examiner* — Yonel Beaulieu
(74) *Attorney, Agent, or Firm* — Buchanan Ingersoll & Ingersoll P.C.

(57) ABSTRACT

A brake ECU acquires the vehicle load (WW) (step S142), and sets a higher start-time criterion value (KT2) when the load (WW) is heavy than when the load (WW) is light (step S144). The brake ECU initiates auxiliary control when the period since the deceleration of the vehicle exceeded a first deceleration determination value is less than or equal to the start-time criterion value (KT2) and the G sensor value exceeds a second deceleration determination value.

2 Claims, 18 Drawing Sheets

(56) References Cited

U.S. PATENT DOCUMENTS

| | | | |
|---|---|---|---|
| 5,925,087 | A | 7/1999 | Ohnishi et al. |
| 6,129,423 | A | 10/2000 | Hashimoto |
| 6,189,987 | B1 | 2/2001 | Shimizu |
| 6,322,164 | B1 * | 11/2001 | Sakamoto et al. ......... 303/115.4 |
| 7,904,246 | B2 * | 3/2011 | Kondoh et al. ............... 701/301 |
| 2001/0038240 | A1 | 11/2001 | Yoshida et al. |
| 2003/0137192 | A1 | 7/2003 | Hano et al. |
| 2004/0124701 | A1 | 7/2004 | Nihei et al. |
| 2004/0183373 | A1 | 9/2004 | Yonemura et al. |
| 2006/0170284 | A1 | 8/2006 | Alvarez et al. |
| 2007/0057574 | A1 | 3/2007 | Mizutani et al. |
| 2007/0124053 | A1 | 5/2007 | Lindskog et al. |
| 2008/0007115 | A1 | 1/2008 | Mizutani |
| 2008/0077296 | A1 | 3/2008 | Kawasaki |
| 2009/0198428 | A1 | 8/2009 | Vourch et al. |
| 2011/0022284 | A1 | 1/2011 | Umakoshi et al. |
| 2011/0073419 | A1 | 3/2011 | Matsuzaki et al. |
| 2011/0295457 | A1 | 12/2011 | Linda et al. |
| 2013/0173134 | A1 | 7/2013 | Terasaka et al. |
| 2013/0325280 | A1 | 12/2013 | Terasaka et al. |
| 2013/0325282 | A1 * | 12/2013 | Terasaka et al. ................ 701/79 |

FOREIGN PATENT DOCUMENTS

| | | | |
|---|---|---|---|
| JP | 9-272418 | A | 10/1997 |
| JP | 9-290743 | A | 11/1997 |
| JP | 9-290744 | A | 11/1997 |
| JP | H11-005522 | A | 1/1999 |
| JP | 11-129876 | A | 5/1999 |
| JP | 11-189140 | A | 7/1999 |
| JP | 2002-193084 | A | 7/2002 |
| JP | 2002-370633 | A | 12/2002 |
| JP | 2002-370634 | A | 12/2002 |
| JP | 2003-312460 | A | 11/2003 |
| JP | 2004-210083 | A | 7/2004 |
| JP | 2005-306160 | A | 11/2005 |
| JP | 2007-320483 | A | 12/2007 |
| JP | 2008-001188 | A | 1/2008 |
| JP | 2009-126356 | A | 6/2009 |
| WO | 2005068271 | A1 | 7/2005 |
| WO | WO 2006/006453 | A1 | 1/2006 |
| WO | 2009060093 | A1 | 5/2009 |

OTHER PUBLICATIONS

Two commonly assigned copending U.S. applications discussed in accompanying Information Disclosure Statement.

Extended European Search Report Issued Feb. 10, 2014, by the European Patent Office in corresponding European Patent Application No. 12746982.3. (4 pages).

International Preliminary Report on Patentability (Form PCT/IB/373) and the Written Opinion of the International Searching Authority (Form PCT/ISA/237) issued on Aug. 21, 2013, by the International Bureau of WIPO in corresponding International Application No. PCT/JP2012/053807. (4 pages).

Office Action issued on Mar. 21, 2014 by the U.S. Patent and Trademark Office in U.S. Appl. No. 13/985,208 (U.S. Appl. No. 13/985,208 is copending application identified in Information Disclosure Statement filed on Aug. 13, 2013). (23 pages).

Extended European Search Report issued on Aug. 10, 2014 by the European Patent Office in European Application No. 12 74 7435.1 (9 PGS).

Official Action issued Oct. 1, 2014 in related U.S. Appl. No. 13/823,385 (10 PGS).

* cited by examiner

VEHICLE BRAKING CONTROL DEVICE AND VEHICLE BRAKING CONTROL METHOD

FIELD OF THE INVENTION

The present invention relates to a braking control device for a vehicle and a braking control method for a vehicle that performs assist control that assists the increasing of a braking force applied to wheels based on an operation of a brake pedal by a driver of a vehicle.

BACKGROUND OF THE INVENTION

As braking control devices for such a vehicle, in the prior art, patent documents 1 and 2 describe examples of braking control devices. In such braking control devices, the starting timing for the assist control is set without using a sensor that directly detects the depression force applied to a brake pedal by a driver (for example, a pressure sensor that detects a master cylinder pressure).

More specifically, in the above braking control device, an estimated vehicle body speed of the vehicle is calculated based on a detection signal from a wheel speed sensor arranged on the vehicle, and an estimated vehicle body deceleration of the vehicle is calculated based on the estimated vehicle body speed. Further, the braking control device calculates a slip rate of a wheel. In a state in which the driver operates the brake pedal, if the calculated estimated vehicle body deceleration is greater than or equal to a preset first emergency braking determination value and a calculated slip rate of a wheel exceeds a preset second emergency braking determination value, it is determined that the current operation of the brake pedal is an emergency braking operation. This starts an assist control. The assist control is also referred to as "brake assist control (BA control)".

Instead of using the slip rate of a wheel, the vehicle body deceleration (also referred to as "G sensor value") may be calculated based on a detection signal from a vehicle body acceleration sensor arranged in the vehicle, and the G sensor value may be used to determine whether the current brake pedal operation is an emergency braking operation.

PRIOR ART DOCUMENTS

Patent Documents

Patent Document 1: Japanese Laid-Open Patent Publication No. 2002-193084
Patent Document 2: Japanese Laid-Open Patent Publication No. 2002-370634

SUMMARY OF THE INVENTION

The following method may be employed as a method for adjusting the initiation timing of assist control by using a wheel speed sensor and a vehicle body acceleration sensor. That is, an estimated vehicle body deceleration, which is calculated by using a detection signal of a wheel speed sensor, is more responsive to operations of the brake pedal by the driver than to a G sensor value, which is calculated by using a detection signal of a vehicle body acceleration sensor. This is because the vehicle body acceleration sensor is located more separated from a vehicle wheel than the wheel speed sensor is from the wheel.

Taking advantage of these characteristics, it is first determined whether an estimated vehicle body deceleration, which is calculated by using a detection signal of the wheel speed sensor, has reached or exceeds a first deceleration determination value. If the estimated vehicle body deceleration has reached or exceeds the first deceleration determination value, it is then determined whether the G sensor value reaches or exceeds a second deceleration determination value during a period in which the time elapsed from when the estimated vehicle body deceleration has reached or exceeded the first deceleration determination value is less than or equal to an initiation time determination reference value. If the G sensor value is greater than or equal to the second deceleration determination value when the elapsed time is less than or equal to the initiation time determination reference value, the assist control is initiated.

However, if the driver operates the brake pedal when the cargo carried by the vehicle is heavy, a change in the G sensor value that corresponds to the operation may be delayed. In such a case, the G sensor value reaches or exceeds the second deceleration determination value after the elapsed time exceeds the initiation time determination reference value, and the assist control therefore may fail start.

The present invention has been made in view of such circumstances as described above. Accordingly, it is an objective of the present invention to provide a braking control device for a vehicle and a braking control method for a vehicle capable of appropriately initiating, regardless of the load applied to the vehicle, assist control that assists the increasing of the braking force applied to the wheels based on a braking operation performed by a driver.

To achieve the foregoing objective and in accordance with one aspect of the present invention, a braking control device for a vehicle is provided that includes first deceleration calculation means (60, S23), second deceleration calculation means (60, S27), assist control means (60, S101, S102, S103, S104, S105, S106, S107), load acquisition means (60, S142), and an initiation time setting means (60, S144). The first deceleration calculation means (60, S23) calculates a first estimated vehicle body deceleration (DV) by using a detection signal of a wheel speed sensor (SE2, SE3, SE4, SE5) arranged on the vehicle. The second deceleration calculation means (60, S27) calculates a second estimated vehicle body deceleration (G) by using a detection signal of a vehicle body acceleration sensor (SE6) arranged on the vehicle. During operation of the brake pedal (31) of the vehicle, the assist control means (60, S101, S102, S103, S104, S105, S106, S107) initiates an assist control, which assists in increasing a braking force applied to a wheel (FR, FL, RR, RL) of the vehicle, when the time elapsed (T5) from when the first estimated vehicle body deceleration (DV) has exceeded a first deceleration determination value (DV_st) is less than or equal to a set initiation time determination reference value (KT2) and the second estimated vehicle body deceleration (G) exceeds a second deceleration determination value (G_st). The load acquisition means (60, S142) acquires a load (WW) of the vehicle. The initiation time setting means (60, S144) sets the initiation time determination reference value (KT2) to a larger value when the load (WW) of the vehicle is heavy than when the load (WW) is light.

According to the above configuration, the initiation time determination reference value is set to a greater value when the load of the vehicle is heavy than when the load is light. This is because when the load is heavy, a change in the second estimated vehicle body speed based on the operation of the brake pedal by the driver is delayed compared to that in a case in which the load is light. This allows the assist control to be appropriately initiated regardless of the load applied to the vehicle.

The braking control device for a vehicle preferably includes a drive force acquisition means (60, S141) that acquires a drive force (ET) applied to the wheel (FR, FL, RR, RL) based on driving operation of a drive source (12) of the vehicle. The load acquisition means (60, S142) estimates the load (WW) of the vehicle based on the drive force (ET) acquired by the drive force acquisition means (60, S141) when the braking operation is not performed and the second estimated vehicle body deceleration (G) calculated by the second deceleration calculation means (60, S27).

The case in which the second estimated vehicle speed is low with a great drive force transmitted to the vehicle wheel can be assumed to a case in which the load of the vehicle is heavy. Accordingly, in the present invention, the load of the vehicle is estimated based on the drive force transmitted to the vehicle wheel when the braking operation is not performed and the second estimated vehicle speed. Thus, there is no need to separately provide a sensor that detects the load of the vehicle, and the weight of the vehicle can be estimated.

The present invention also provides a braking control method for a vehicle that includes: a first deceleration calculating step (S23) for calculating a first estimated vehicle body deceleration (DV) by using a detection signal of a wheel speed sensor (SE2, SE3, SE4, SE5) arranged on the vehicle; a second deceleration calculating step (S27) for calculating a second estimated vehicle body deceleration (G) by using a detection signal of a vehicle body acceleration sensor (SE6) arranged on the vehicle; an assist step (S101, S102, S103, S104, S105, S106, S107) for, during operation of the brake pedal (31) of the vehicle, initiating an assist control, which assists in increasing a braking force applied to a wheel (FR, FL, RR, RL) of the vehicle, when the time elapsed (T5) from when the first estimated vehicle body deceleration (DV) has exceeded a first deceleration determination value (DV_st) is less than or equal to a set initiation time determination reference value (KT2) and the second estimated vehicle body deceleration (G) exceeds a second deceleration determination value (G_st); a load acquisition step (S142) for acquiring a load (WW) of the vehicle; and an initiation time setting means step (S144) for setting the initiation time determination reference value (KT2) to a larger value when the load (WW) of the vehicle is heavy than when the load (WW) is light.

The above configuration obtains the same operations and advantages as the above-described braking control device of the vehicle.

DETAILED DESCRIPTION OF THE PREFERRED EMBODIMENTS

First Embodiment

One embodiment of the present invention will now be described with reference to FIGS. 1 to 19. In the following description of the present specification, the travelling direction (forward direction) of a vehicle is referred to as the frontward side (front of vehicle).

Figure 1:
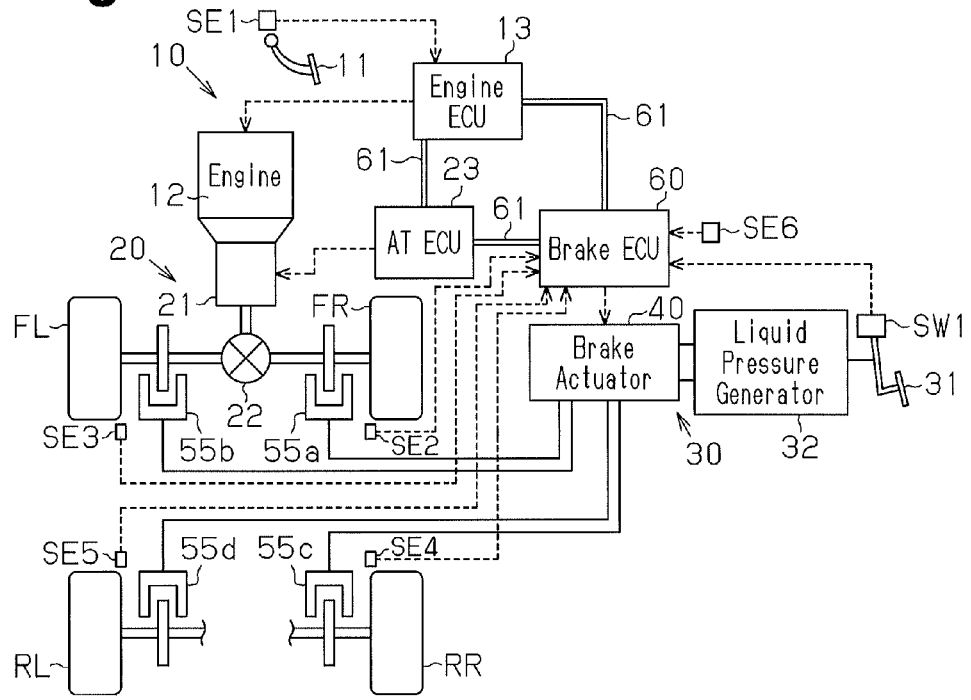
FIG. 1 is a block diagram illustrating a vehicle including a braking control device according to one embodiment of the present invention.

Referring to FIG. 1, the vehicle of the present embodiment is a front wheel drive vehicle including a plurality of (four in the present embodiment) wheels (right front wheel FR, left front wheel FL, right rear wheel RR and left rear wheel RL), among which the front wheels FR and FL are the drive wheels. The vehicle includes a drive force generator 10, which has an engine 12 serving as one example of a power source that generates drive force corresponding to the amount of an accelerator pedal (accelerator operating member) 11 operated by a driver, and a drive force transmission device 20, which transmits the drive force generated by the drive force generator 10 to the front wheels FR and FL. The vehicle includes a braking device 30 which applies, to the wheels FR, FL, RR, and RL, a braking force in correspondence with the driver's depression operation performed on a brake pedal 31.

The drive force generator 10 includes a fuel injection system (not shown) arranged in the vicinity of an intake port (not shown) of the engine 12 and including an injector for injecting fuel into the engine 12. The drive force generator 10 is controlled by an engine ECU 13 (also referred to as "engine electronic control unit") including a CPU, a ROM and a RAM (none shown). An accelerator operation amount sensor SE1, which is arranged in the vicinity of the accelerator pedal 11 to detect the operation amount of the accelerator pedal 11 operated by the driver, is electrically connected to the engine ECU 13. The engine ECU 13 calculates the accelerator operation amount based on a detection signal from the accelerator operation amount sensor SE1 and controls the drive force generator 10 based on the calculated accelerator operation amount.

The drive force transmission device 20 includes an automatic transmission 21, which is one example of a transmission, and a differential gear 22, which appropriately distributes and transmits the drive force transmitted from an output shaft of the automatic transmission 21 to the front wheels FL and FR. The drive force transmission device 20 is controlled by an AT ECU 23 (AT electronic control unit) including a CPU, a ROM and a RAM (all not shown). The AT ECU 23 controls the automatic transmission 21 (upshift control and downshift control) in accordance with the vehicle body speed of the vehicle and the states of the operations performed by the driver on accelerator pedal 11, the brake pedal 31, and a shifting device (not shown).

Figure 2:
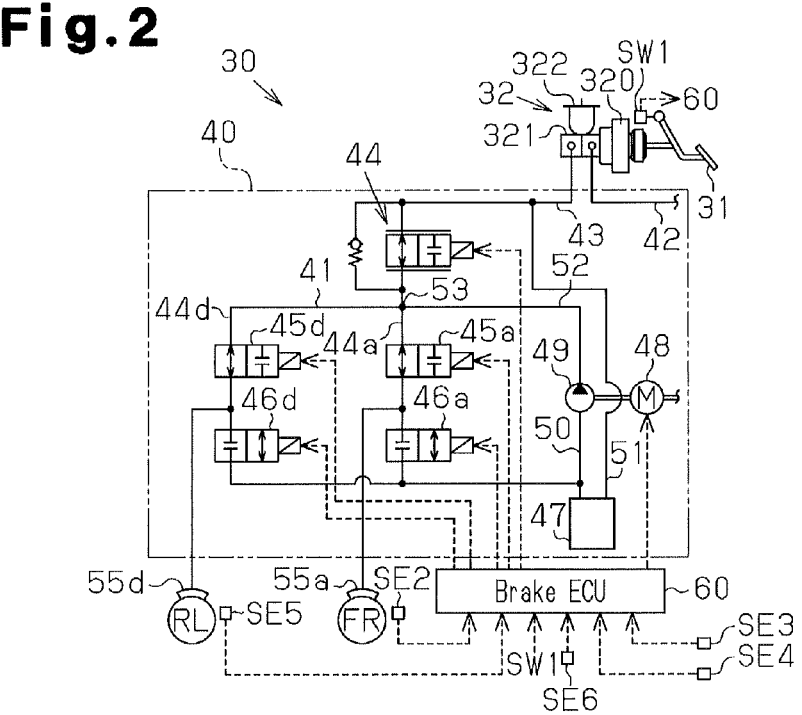
FIG. 2 is a schematic diagram illustrating the structure of a braking device.

As shown in FIGS. 1 and 2, the braking device 30 includes a liquid pressure generator 32 and a brake actuator 40. The liquid pressure generator 32 includes a booster 320, a master cylinder 321, and a reservoir 322. The brake actuator 40 includes two liquid pressure circuits 41 and 42 (shown by broken lines in which a long dash alternates with a pair of short dashes in FIG. 2). The liquid pressure generator 32 includes a brake switch SW1, which detects whether or not the brake pedal 31 is depressed by a driver. The brake switch SW1 sends a detection signal to a brake ECU 60 (also referred to as "brake electronic control unit"), which controls the brake actuator 40.

The liquid pressure circuits 41 and 42 are connected to the master cylinder 321 of the liquid pressure generator 32. A wheel cylinder 55a for the right front wheel FR and a wheel cylinder 55d for the left rear wheel RL are connected to the first liquid pressure circuit 41. A wheel cylinder 55b for the left front wheel FL and a wheel cylinder 55c for the right rear wheel RR are connected to the second liquid pressure circuit 42. The booster 320 and the master cylinder 321 are operated when the driver of the vehicle depresses the brake pedal 31. This supplies brake fluid from the master cylinder 321 into the wheel cylinders 55a to 55d through the liquid pressure circuits 41 and 42. Then, a braking force corresponding to the wheel cylinder pressure (also referred to as "WC pressure", hereinafter) in each of the wheel cylinders 55a to 55d is applied to the wheels FR, FL, RR, and RL.

Next, the brake actuator 40 will be described with reference to FIG. 2. Since the liquid pressure circuits 41 and 42 have substantially the same structure, only the first liquid pressure circuit 41 is shown in FIG. 2 for the sake of convenience, and the second liquid pressure circuit 42 is not illustrated in the drawing.

As shown in FIG. 2, the first liquid pressure circuit 41 includes a connection passage 43 connected to the master cylinder 321. The connection passage 43 includes a normally-open type linear solenoid valve 44, which is operated to generate a pressure difference between a master cylinder pressure (also referred to as the "MC pressure") in the master cylinder 321 and the WC pressures in the wheel cylinders 55a and 55d. A left front wheel passage 44a connected to the wheel cylinder 55a for the left front wheel FR and a right rear wheel passage 44d connected to the wheel cylinder 55d for the right rear wheel RL are formed in the first liquid pressure circuit 41. The passages 44a and 44d respectively includes pressure increasing valves 45a and 45d, which are operated when restricting increasing of the WC pressures of the wheel cylinders 55a and 55d and which are normally-open type solenoid valves, and pressure decreasing valves 46a and 46d, which are operated when decreasing the WC pressures in the wheel cylinders 55a and 55d and which are normally-closed type solenoid valves.

A reservoir 47, which temporarily stores the brake fluid that flows out each of the wheel cylinders 55a and 55d through the pressure decreasing valves 46a and 46d, and a pump 49, which is operated by the rotation produced by a motor 48, are connected to the first liquid pressure circuit 41.

The reservoir 47 is connected to the pump 49 through a suction flow passage 50 and connected to the connection passage 43 through a master side flow passage 51 at a location closer to the master cylinder 321 than the linear solenoid valve 44. The pump 49 is connected by a supply flow passage 52 to a connecting portion 53 between the linear solenoid valve 44 and the pressure increasing valves 45a and 45d in the first liquid pressure circuit 41. When the motor 48 produces rotation, the pump 49 draws in brake fluid from the reservoir 47 and the master cylinder 321 through the suction flow passage 50 and the master side flow passage 51 and discharges the brake fluid into the supply flow passage 52.

Next, as one example of a depression force estimation device, the braking control device and the brake ECU 60 will be described with reference to FIGS. 1 and 2.

As shown in FIGS. 1 and 2, the brake switch SW1, wheel speed sensors SE2, SE3, SE4 and SE5 that detect rotational speeds of the wheels FR, FL, RR, and RL, and a vehicle body acceleration sensor SE6 that detects a G sensor value, which is the vehicle body deceleration in the longitudinal direction of the vehicle, are electrically connected to an input interface of the brake ECU 60. The motor 48 and the valves 44, 45a, 45d, 46a and 46d forming the brake actuator 40 are electrically connected to an output interface of the brake ECU 60.

The vehicle body acceleration sensor SE6 outputs a signal in which the G sensor value becomes a negative value when the vehicle accelerates because the center of gravity of the vehicle moves rearward and a signal in which the G sensor value becomes a positive value when the vehicle decelerates because the center of gravity of the vehicle moves forward. Thus, the G sensor value becomes a negative value when the vehicle stops on a sloped road directed uphill and becomes a positive value when the vehicle is on a sloped road directed downhill.

The brake ECU 60 includes a CPU, a ROM and a RAM or the like (none shown). Various kinds of control processing (braking control processing and the like shown in FIG. 8 for example), various kinds of maps (maps and the like shown in FIGS. 6 and 7), and various threshold values are stored in advance in the ROM. The RAM stores various kinds of information (wheel speed, G sensor value and the like) that are appropriately rewritten when an ignition switch (not shown) of the vehicle is ON. The brake ECU 60 can communicate with other ECUs 13 and 23 of the vehicle through a bus 61.

The braking device 30 of the present embodiment assists the increasing of the braking force applied to the wheels FR, FL, RR, and RL when the current depression operation performed on the brake pedal 31 by the driver is an emergency braking operation. However, the braking device 30 of the present embodiment does not include a sensor that directly detects the depression force applied to the brake pedal 31 by the driver (e.g., pressure sensor for detecting MC pressure). Hence, in the present embodiment, instead of a pressure sensor, the wheel speed sensors SE2 to SE5 and the vehicle body acceleration sensor SE6 are used to determine whether the current depression operation of the brake pedal 31 performed by the driver is an emergency braking operation.

Next, a braking control method using the wheel speed sensors SE2 to SE5 and the vehicle body acceleration sensor SE6 will be described with reference to the timing chart shown in FIG. 3.

Figure 3:
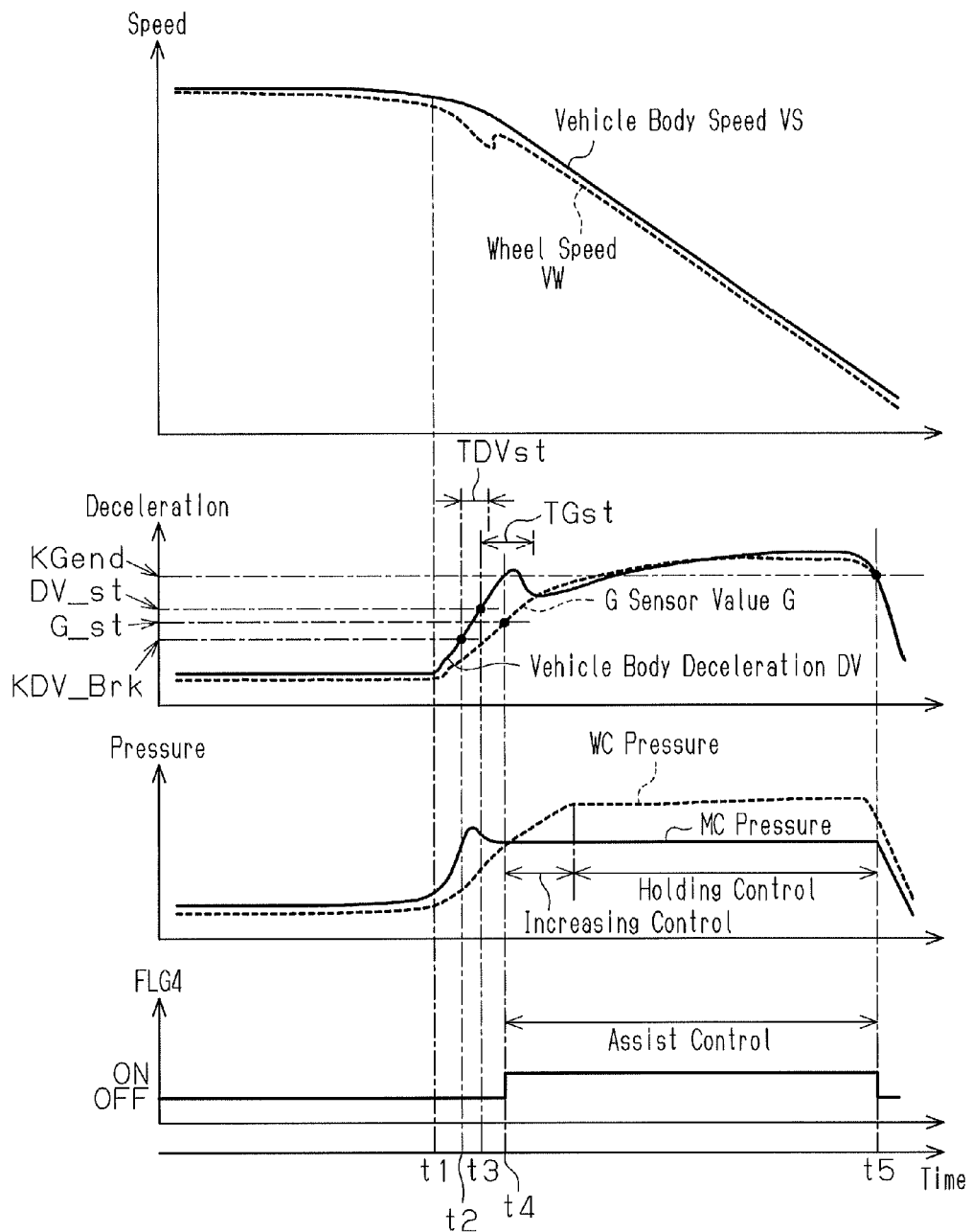
FIG. 3 is a timing chart illustrating a state in which assist control is executed when the vehicle is decelerating.

As shown in FIG. 3, if a driver starts depressing the brake pedal 31 at a first timing t1, the MC pressure in the master cylinder 321 starts increasing. The WC pressure in the wheel cylinders 55a to 55d also starts to increase following the increase in the MC pressure. As a result, a braking force with a magnitude corresponding to the WC pressure is applied to the wheels FR, FL, RR, and RL. This suddenly decreases the wheel speed VW of each of the wheels FR, FL, RR, and RL, that is, the moving speed of the wheel relative to the road surface. When the wheel speed VW decreases in this manner, the vehicle body speed VS starts to decrease. In the following description, the "wheel speed VW" refers to a value obtained using a detection signal of each of the wheel speed sensors SE2 to SE5, that is, a signal indicative of the wheel rotational speed.

As a result, the vehicle body deceleration (first estimated vehicle body deceleration) DV calculated using the detection signal of at least one of the wheel speed sensors SE2 to SE5 starts to increase. Slightly after the vehicle body deceleration DV increases, the G sensor value (second estimated vehicle body deceleration) G, which is calculated using a detection signal of the vehicle body acceleration sensor SE6, starts to increase. The wheel speed sensors SE2 to SE5 are arranged at positions in the vicinity of the wheels FR, FL, RR, and RL, whereas the vehicle body acceleration sensor SE6 is separated from the wheels FR, FL, RR, and RL. Specifically, the vehicle body acceleration sensor SE6 is arranged on a vehicle body (not shown), which is supported by the suspension (not shown) of the vehicle. Hence, when a braking force is applied to the wheels FR, FL, RR, and RL, the G sensor value G starts to change slightly after the vehicle body deceleration DV.

When the vehicle body deceleration DV exceeds a first deceleration determination value DV_st, which is set to be greater than a braking determination value KDV_Brk, before the time elapsed from the second timing t2, at which the vehicle body deceleration DV exceeds the braking determination value KDV_Brk, exceeds first reference elapsed time TDVst, a first initiation determination condition is satisfied (third timing t3). Subsequently, when the G sensor value G exceeds a second deceleration determination value G_st before the time elapsed from when the third timing t3 exceeds a second reference elapsed time TGst (e.g., 102 milliseconds), a second initiation determination condition is satisfied (fourth timing t4). If the first and second initiation determination conditions are satisfied, it is determined that the current driver's depression operation on the brake pedal 31 is an emergency braking operation.

As a result, an assist control condition satisfaction flag FLG4 is set from OFF to ON, and the assist control (also referred to as "brake assist control" and "BA control") for assisting to increase a braking force applied to the wheels FR, FL, RR, and RL is started. The assist control condition satisfaction flag FLG4 is set to ON from establishment of an initiating condition of the assist control to establishment of a termination condition of the assist control.

The assist control includes an increasing control, which increases the WC pressure in each of the wheel cylinders 55a to 55d to increase the braking force applied to the wheels FR, FL, RR, and RL, and a holding control, which holds the WC pressure to hold the braking force applied to the wheels FR, FL, RR, and RL. In the increasing control, the linear solenoid valve 44 and the pump 49 (motor 48) are operated (see FIG. 2). If the increasing control is performed during a preset increase requisition time, the control is shifted to the holding control. In the holding control, the pump 49 is stopped, and the WC pressure in each of the wheel cylinders 55a to 55d is held by the operation of the linear solenoid valve 44. When a driver's depression operation amount of the brake pedal 31 is changed, the WC pressure in the wheel cylinders 55a to 55d is increased or decrease in correspondence with the change.

Then, when the depression operation amount of the brake pedal 31 becomes small or the brake pedal 31 is released from the depressed state, the termination condition of the assist control is satisfied, the assist control condition satisfaction flag FLG4 is set to OFF, and the assist control is terminated. That is, the supply of power to the linear solenoid valve 44 is stopped, and the braking force applied to the wheels FR, FL, RR, and RL is reduced. An example of the termination condition is the G sensor value G becoming less than the second deceleration determination value G_st.

The above-described braking control method has the problems described below.

A first problem is that among the vehicle body deceleration DV, which is calculated using the detection signals of the wheel speed sensors SE2 to SE5, and the G sensor value G, which is calculated using a detection signal of the vehicle body acceleration sensor SE6, in particular, the vehicle body deceleration DV includes a vibration component resulting from outer disturbance. Examples of the outer disturbance include reaction forces received by the wheels FR, FL, RR, and RL from the surface of the road along which the vehicle travels and interference between the drive force transmitted to the front wheels FR and FL, which are the drive wheels, and the braking force applied to the front wheels FR and FL.

The magnitude of the reaction force received by each of the wheels FR, FL, RR, and RL from a road surface changes between a bad road having an uneven surface and a good road having an even surface. Moreover, even with a bad road, the magnitude of a vibration component in the vehicle body deceleration DV changes in accordance with how uneven the road is. Further, when a vehicle moves over a bump on a road, a vibration component generated when the vehicle moves over the bump is included in the vehicle body deceleration DV. To solve such a problem, it is preferred that the degree of unevenness of the road surface be estimated, the movement of the vehicle over a bump be estimated, and the first deceleration determination value DV_st be corrected based on the estimation result.

The interference between the drive force and braking force applied to the wheels FR, FL, RR, and RL may occur when the automatic transmission 21 is downshifted during a braking operation. When a gear is downshifted in the automatic transmission 21 (e.g., shifted from fourth gear to third gear), the drive force transmitted to the front wheels FR and FL becomes greater than just before the downshifting. As a result, interference occurs between the drive force and braking force applied to the front wheels FR and FL. A vibration component caused by the interference is included in the vehicle body deceleration DV. Hence, when the automatic transmission 21 is downshifted or when there is a high probability that the automatic transmission 21 is downshifted, it is preferred that the first deceleration determination value DV_st be set as a large value.

A vibration component caused by outer disturbance is not included in the G sensor value G as much as the vehicle body deceleration DV. This is because the suspension (not shown) that supports the vehicle body functions as a damper.

A second problem is that detection signals from the wheel speed sensors SE2 to SE5 are easily affected by the gradient of the road surface. As shown in the timing chart of FIG. 4, when a road surface on which the vehicle is traveling is a sloped road, a difference that corresponds to the gradient of the road surface is produced between the vehicle body deceleration DV and the G sensor value G. That is, when the road is a sloped road directed uphill, gravity applied to the vehicle acts on the vehicle body as a braking force, and a component of the braking force is included in the vehicle body deceleration DV. When the road is a sloped road directed downhill, gravity applied to the vehicle acts on the vehicle body as a propulsive force, and a component of the propulsive force is included in the vehicle body deceleration DV. Hence, unless the first deceleration determination value DV_st is corrected in accordance with the gradient of the road surface, the vehicle body deceleration DV easily exceeds the first deceleration determination value DV_st when the road is a sloped road directed uphill, and the vehicle body deceleration DV is less prone to exceed the first deceleration determination value DV_st when the road is a sloped road directed downhill.

The G sensor value G is deviated from the vehicle body deceleration DV by an amount corresponding to the gradient of a road surface. That is, the G sensor value G becomes less than the vehicle body deceleration DV when the road is a sloped road directed uphill, and the G sensor value G becomes greater than the vehicle body deceleration DV when the road is a sloped road directed downhill. In other words, the timing for initiating assist control varied depending on the gradient of a road surface. To suppress such variations in the initiation timing, it is preferred that the first deceleration determination value DV_st and the second deceleration determination value G_st be corrected based on the gradient of the road surface.

Figure 5:
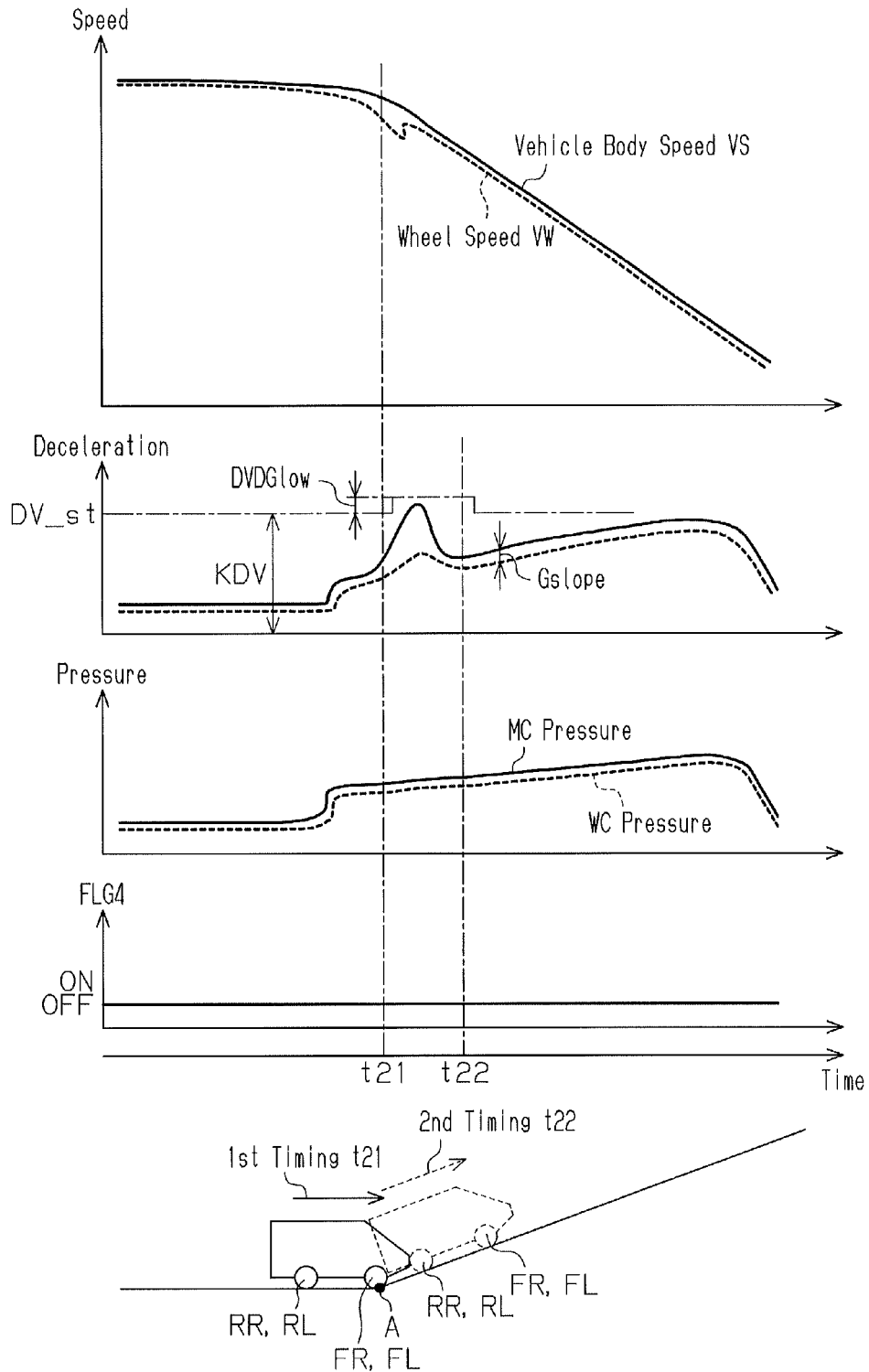
FIG. 5 is a timing chart taken when the gradient of the road on which the vehicle is traveling changes to an uphill side.

When the gradient of a road surface on which the vehicle travels changes and indicates an uphill slope, the braking force resulting from the change in the gradient of the road surface is applied to the front wheels FR and FL as shown in the timing chart of FIG. 5. That is, when only the front wheels FR and FL of the wheels FR, FL, RR, and RL pass by a changing point A of the gradient, gravity acting on the vehicle body is applied to the front wheels FR and FL as a braking force (first timing t21). This suddenly decreases the wheel speed VW of the front wheels FR and FL, and the vehicle body deceleration DV suddenly increases. At the same time, the suspension (not shown) absorbs the change in the gradient of the road surface. Thus, the G sensor value G does not change as much as the vehicle body deceleration DV. Thus, the gradient change of the vehicle body deceleration DV differs greatly from the gradient change of the G sensor value G.

Then, when the rear wheels RR and RL also pass by the changing point A of the gradient, the difference between the vehicle body deceleration DV and the G sensor value G approaches the difference corresponding to the gradient of the road surface (second timing t22). That is, unless the first deceleration determination value DV_st is corrected, the vehicle body deceleration DV may easily exceed the first deceleration determination value DV_st between the first timing t21 and the second timing t22 thereby unintentionally satisfying the initiating condition of the assist control. Hence, when the gradient of a road surface changes and indicates an uphill slope, it is preferred that the first deceleration determination value DV_st be corrected to a larger value.

Depending on the driver's depression operation on the brake pedal 31, the necessity for the assist control may be null or low. A highly skilled driver who is good at driving the vehicle can appropriately depress the brake pedal 31 when necessary. More specifically, when emergency braking is necessary, a highly skilled driver can readily and strongly depress the brake pedal 31. In this case, a sufficiently large braking force can be readily applied to the wheels FR, FL, RR, and RL just by the driver's depression operation on the brake pedal 31. Thus, assist control is unnecessary. Hence, based on the detection signals from the wheel speed sensors SE2 to SE5 and the vehicle body acceleration sensor SE6, when determining that the driver is applying a large depression force to the brake pedal 31, it is preferred that the assist control not be performed.

When the initiating condition of the assist control is satisfied and immediately after the increasing control of the assist control is initiated, anti-lock braking control (also referred to as "ABS control", hereinafter) that prevents locking of the wheels FR, FL, RR, and RL from locking may be initiated. Immediately after the increasing control is initiated, the driver's depression operation of the brake pedal 31 may initiate the ABS control. Immediately after the increasing control of the assist control is initiated, the vehicle body deceleration DV may become greater than or equal to the deceleration corresponding to the road surface limit (e.g., 1.2 G). In this case, if the braking force applied to the wheels FR, FL, RR, and RL is further increased, the possibility of the ABS control being initiated is high. In such cases, a sufficiently large braking force may be applied to the wheels FR, FL, RR, and RL just by the driver's depression operation on the brake pedal 31. Hence, it is preferred that the assist control be terminated.

The ABS control may be initiated during execution of the holding control of the assist control. Such a case may occur when the road surface along which the vehicle is traveling is switched from a high ρ road to a low ρ road and the slip rates of the wheels FR, FL, RR, and RL become high. If the ABS control is initiated during execution of the holding control, the braking force applied to the wheels FR, FL, RR, and RL is reduced to lower the slip rates of the wheels FR, FL, RR, and RL. Then, as the braking force applied to the wheels FR, FL, RR, and RL decreases, the vehicle body deceleration DV and the G sensor value G also decrease. In this case, the driver most likely does not intend to perform a braking operation that reduces the braking force applied to the wheels FR, FL, RR, and RL. Thus, it is preferred that the assist control not be terminated. Further, after the ABS control is initiated, the road surface may be switched again from a low ρ road to a high ρ road. In such a case, if a driver's depression operation amount of the brake pedal 31 remains large, the assist control should be continued. In this manner, when the ABS control is initiated during execution of the holding control, it is preferred that the holding control be continued.

Even if the driver's depression operation amount of the brake pedal 31 is reduced during execution of the assist control, the assist control may not be terminated. This is because the G sensor value G may be greater than or equal to the second deceleration determination value G_st due to just the braking force applied to the wheels FR, FL, RR, and RL based on execution of the assist control. Hence, the threshold value used when determination termination of the assist control should take into consideration the braking force applied to the wheels FR, FL, RR, and RL by the execution of the assist control.

The brake ECU 60 of the present embodiment sets the starting timing and terminating timing of the assist control taking the above-described matters into consideration. Next, a map required for the brake ECU 60 to set the timing for initiating the assist control will be described with reference to FIGS. 6 and 7.

Figure 6:
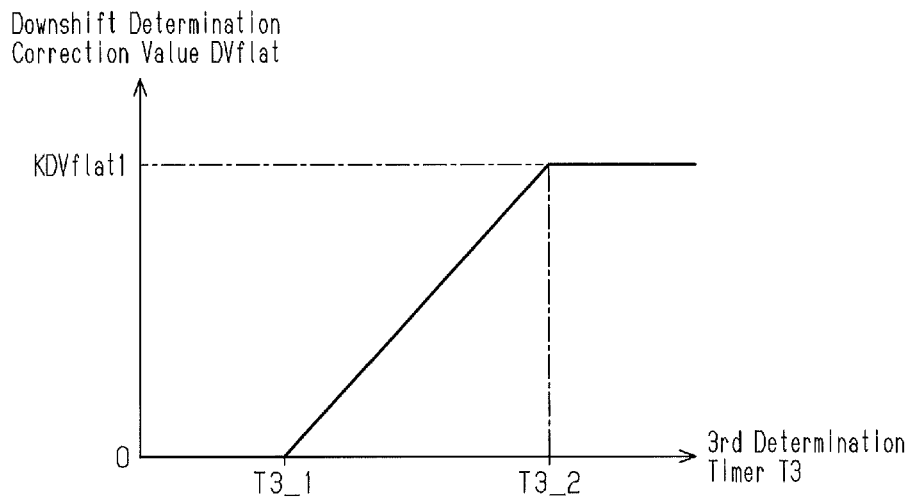
FIG. 6 is a map for setting a downshift determination value.

A first map shown in FIG. 6 will now be described.

The first map is used to correct the first deceleration determination value DV_st when it determined that there is a possibility that the automatic transmission 21 will be downshifted. The horizontal axis of the first map shows a third determination timer T3 corresponding to the duration time of a state in which the G sensor value G exceeds a downshift determination value, which is set to determine whether there is a possibility that the automatic transmission 21 will be downshifted. The vertical axis of the first map shows a downshift determination correction value DVflat, which is the correction amount of the first deceleration determination value DV_st. As shown in FIG. 6, when the third determination timer T3 is less than or equal to the first time T3__1 (e.g., 14), the downshift determination correction value DVflat is set to "0 (zero)", and when the third determination timer T3 is greater than or equal to second time T3__2 (e.g., 50), which is longer than the first time T3__1, the downshift determination correction value DVflat is set to a maximum correction value KDVflat1 (e.g., 0.5 G). When the third determination timer T3 is greater than the first time T3__1 and less than the second time T3__2, the downshift determination correction value DVflat is set to a larger value as the value of the third determination timer T3 increases.

Next, a second map shown in FIG. 7 will be described.

The second map is used to set a gradient change reference value KDGlow for determining whether or not the gradient of the road surface along which the vehicle is traveling has changed and indicates an uphill slope. The expression "gradient of a road surface is changed and indicates an uphill slope" refers to an increase in the gradient of the road surface along which the vehicle is traveling. This expression includes a case in which when the gradient is a negative value, the absolute value of the gradient becomes small, that is, the gradient of the downhill slope becomes gradual.

Figure 7:
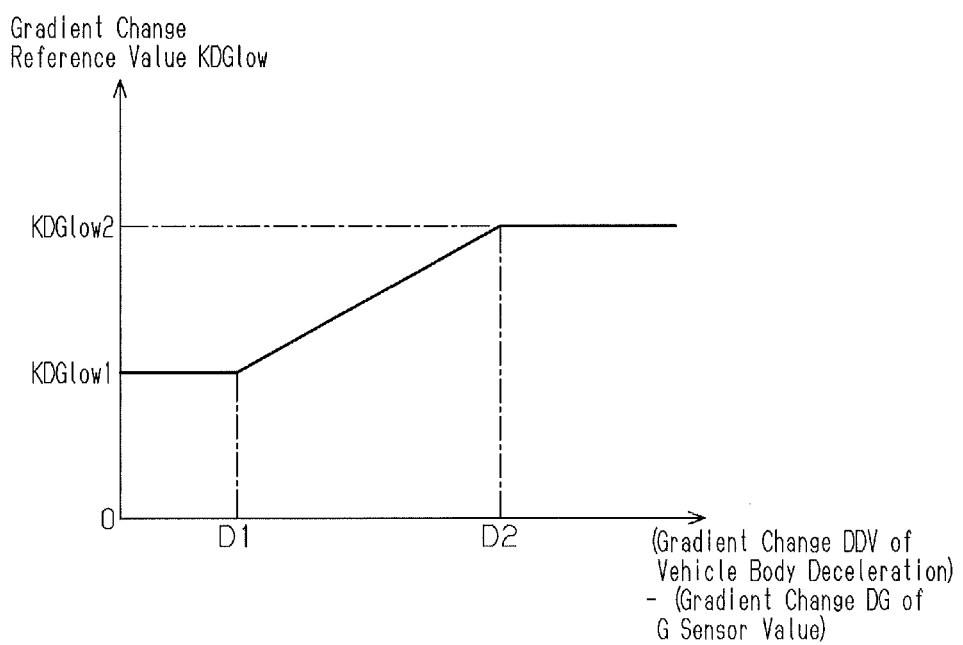
FIG. 7 is a map for setting a gradient change reference value.

As shown in FIG. 7, the horizontal axis of the second map shows a subtraction value (=DDV−DG) obtained by subtracting a gradient change DG of the G sensor value G from a gradient change DDV of the vehicle body deceleration DV, and the vertical axis of the second map shows the gradient change reference value KDGlow. When the subtraction value (=DDV−DG) is less than or equal to a first deceleration value D1 (e.g., 0.3 G), the gradient change reference value KDGlow is set to a first reference value KDGlow1 (e.g., 2 G/s). When the subtraction value is greater than or equal to a second subtraction value D2 (e.g., 0.5 G), which is greater than the first deceleration value D1, the gradient change reference value KDGlow is set to a second reference value KDGlow2 (e.g., 4 G/s), which is greater than the first reference value KDGlow1. When the subtraction value is greater than the first deceleration value D1 and less than the second subtraction value D2, the gradient change reference value KDGlow is set to a larger value as the subtraction value increases.

The gradient change DDV of the vehicle body deceleration indicates a change amount of the vehicle body deceleration DV per unit time and is acquired by time-differentiating the vehicle body deceleration DV, for example. In the same manner, the gradient change DG of the G sensor value indicates a change amount of the G sensor value G per unit time and is acquired by time-differentiating the G sensor value G, for example.

Figure 8:
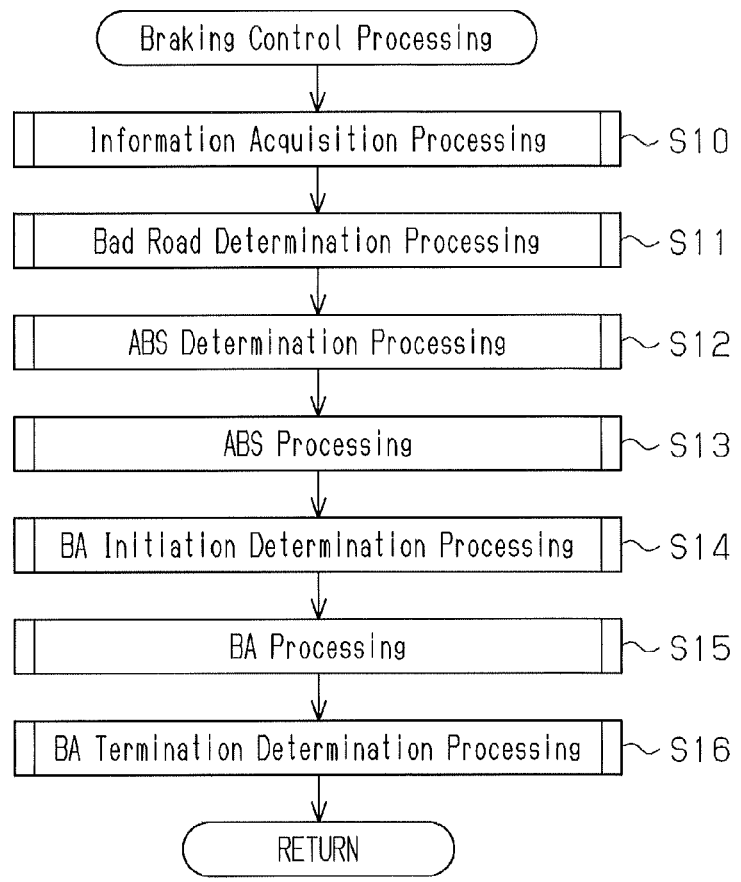
FIG. 8 is a flowchart illustrating a braking control processing routine.

Next, various kinds of control processing routines executed by the brake ECU 60 of the present embodiment will be described with reference to flowcharts shown in FIGS. 8 to 14. FIG. 8 shows a braking control processing routine mainly executed by the brake ECU 60.

The braking control processing routine is executed in predetermined time cycles (e.g., 6 milliseconds) that are determined in advance. In the braking control processing routine, the brake ECU 60 performs information acquisition processing for acquiring various kinds of information (such as wheel speed) necessary when assist control or anti-lock braking control is performed (step S10). Subsequently, the brake ECU 60 performs bad road determination processing for acquiring a bad road index that numerically indicates the unevenness degree of the road surface along which the vehicle is traveling (step S11).

The brake ECU 60 performs ABS determination processing to determine whether or not the initiating condition of the ABS control is satisfied (step S12). Specifically, when the brake switch SW1 is ON, the brake ECU 60 determines whether a slip rate of each of the wheels FR, FL, RR, and RL is greater than or equal to a preset slip rate determination value and completes the ABS determination processing. The slip rate is a value calculated by the information acquisition processing. The calculation of the slip rate will be described below (see step S22 in FIG. 9).

Then, the brake ECU 60 performs ABS processing to prevent locking of the wheel (e.g., right front wheel FR) of which slip rate becomes greater than or equal to a slip rate determination value (step S13). Specifically, the brake ECU 60 repeatedly and sequentially performs a decreasing control for decreasing the braking force applied to the wheel that is subject to control (e.g., right front wheel FR) and an increasing control for increasing the braking force (and a holding control for holding the braking force). At this time, the brake ECU 60 operates the pump 49, the pressure decreasing valve and the pressure increasing valve for the wheel that is subject to control. Therefore, in the present embodiment, the brake ECU 60 functions as an ABS control unit.

The brake ECU 60 performs BA initiation determination processing for determining whether or not the initiating condition of the assist control is satisfied (step S14). When satisfied, the brake ECU 60 performs BA processing to execute the assist control (step S15). Subsequently, the brake ECU 60 determines whether or not the termination condition of the assist control is satisfied. When satisfied, the brake ECU 60 performs BA termination determination processing for terminating the assist control (step S16) and temporarily terminates the braking control processing routine.

Next, the information acquisition processing routine in step S10 will be described with reference to the flowchart of FIG. 9.

In the information acquisition processing routine, the brake ECU 60 calculates the wheel speeds VW of the wheels FR, FL, RR, and RL based on the detection signals from the wheel speed sensors SE2 to SE5 (step S20). Subsequently, the brake ECU 60 calculates the vehicle body speed VS (also referred to as the "estimated vehicle body speed") based on the calculated wheel speeds VW of at least one of the wheels FR, FL, RR, and RL (step S21). For example, the brake ECU 60 calculates a vehicle body speed VS based on the wheel speeds VW of the rear wheels RR and RL, which are the driven wheels when a braking operation is not performed, and calculates the vehicle body speeds VS based on the wheel speeds VW of the wheels including the front wheels FR and FL, which are the drive wheels when the braking operation is performed. Accordingly, in the present embodiment, the brake ECU 60 also functions as a vehicle body speed calculation unit. Then, the brake ECU 60 calculates slip rates SLP (=(VS−VW)/VW)) of the wheels FR, FL, RR, and RL (step S22). Subsequently, the brake ECU 60 calculates the vehicle body deceleration DV of the vehicle based on the vehicle body speed VS calculated in step S21 (step S23). Accordingly, in the present embodiment, the brake ECU 60 also functions as a first deceleration calculation unit that calculates the vehicle body deceleration (first estimated vehicle body deceleration) DV of the vehicle using detection signals of the wheel speed sensors SE2 to SE5. Further, step S23 corresponds to a first deceleration calculating step. The vehicle body deceleration DV becomes a positive value when the vehicle is decelerated and becomes a negative value when the vehicle is accelerated.

Figure 15A:
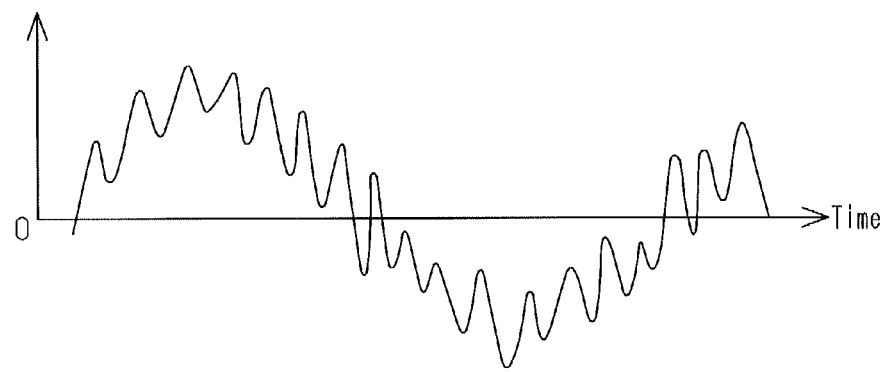
FIG. 15(a) is a timing chart showing changes in the vehicle body deceleration.
Figure 15B:
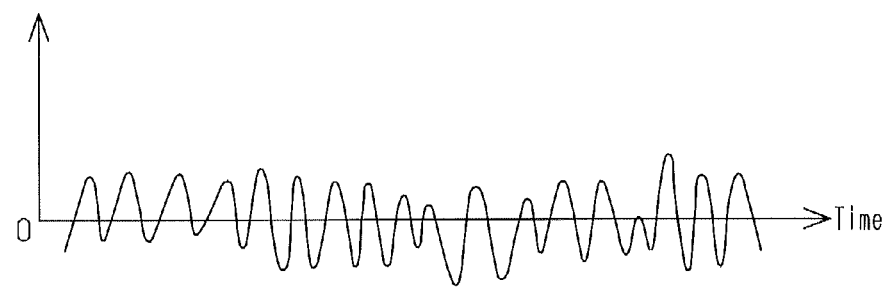
FIG. 15(b) is a timing chart showing changes in the noise component.
Figure 16:
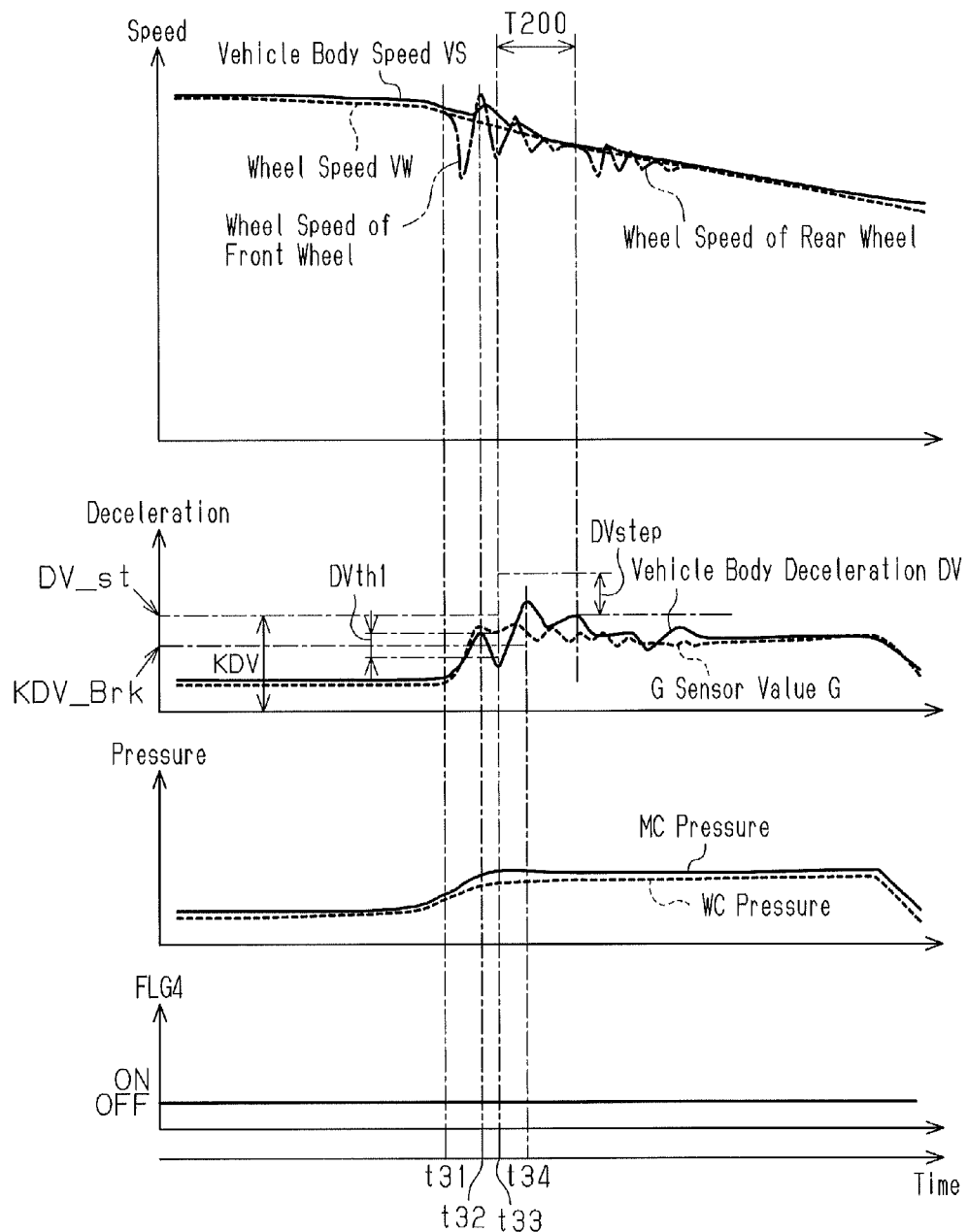
FIG. 16 is a timing chart illustrating a case in which the vehicle moves over a bump on a road.

Then, the brake ECU 60 acquires a gradient change DDV of the vehicle body deceleration DV calculated in step S23 (step S24). Subsequently, the brake ECU 60 performs filtering processing to remove a high frequency change component from the vehicle body deceleration DV calculated in step S23 and acquires a leveled vehicle body deceleration DVf1 (step S25). As shown in FIG. 15, the brake ECU 60 performs a filtering processing to remove a low frequency change component from the vehicle body deceleration DV calculated in step S23 and acquires a noise component DVf2 (step S26). The noise component DVf2 is used when a bad road index is acquired.

Figure 9:
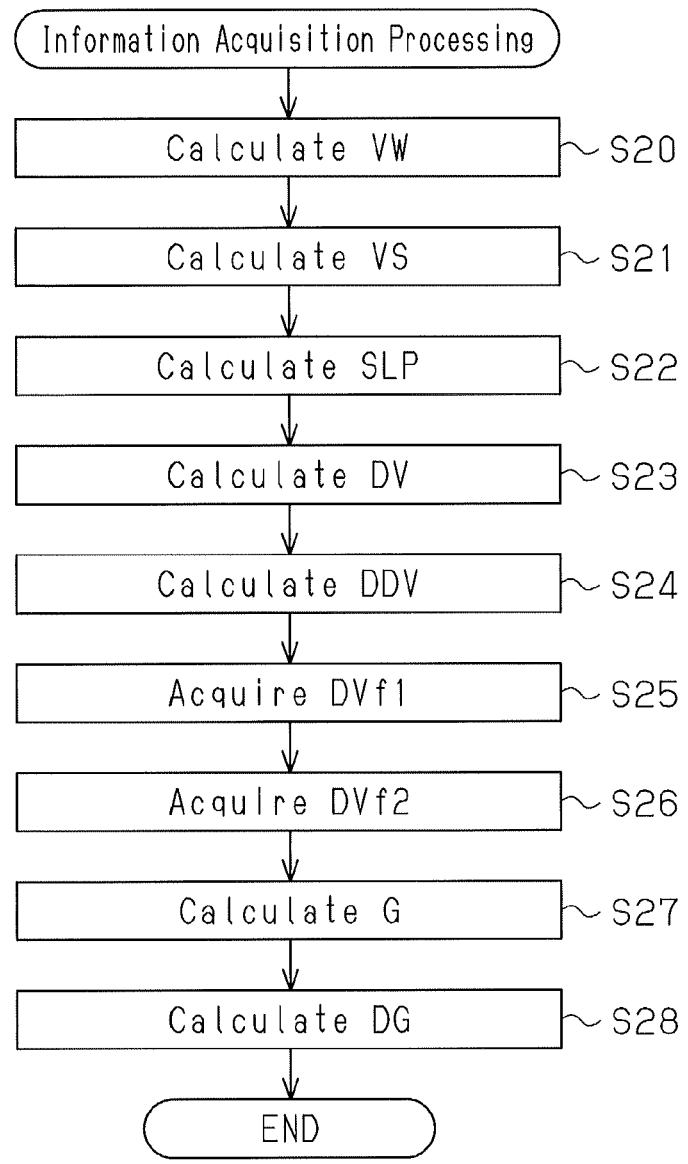
FIG. 9 is a flowchart illustrating an information acquisition processing routine.

Thereafter, returning to the flowchart of FIG. 9, the brake ECU 60 calculates the G sensor value G based on a detection signal from the vehicle body acceleration sensor SE6 (step S27). Accordingly, in the present embodiment, the brake ECU 60 also functions as a second deceleration calculation unit that calculates the G sensor value (second estimated vehicle body deceleration) G of the vehicle by using a detection signal of the vehicle body acceleration sensor SE6. Step S27 corresponds to a second deceleration calculating step. Then, the brake ECU 60 calculates, as gradient information, the gradient change DG of the G sensor value G calculated in step S27 (step S28) and terminates the information acquisition processing routine. Accordingly, in the present embodiment, the brake ECU 60 also functions as a gradient information acquisition unit for calculating, as gradient information, the gradient change DG of the G sensor value (second estimated vehicle body deceleration). The brake ECU 60 also functions as a gradient change acquisition unit, which acquires the gradient change DDV of the vehicle body deceleration and the gradient change DG of the G sensor value.

Next, a bad road determination processing routine of step S11 will be described with reference to the timing chart of FIG. 15.

In the bad road determination processing routine, the brake ECU 60 acquires the noise component DVf2 from a predetermined number of samples calculated in step S26 and calculates a dispersion value of the noise component DVf2. The dispersion value of the noise components DVf2 is a value obtained by squaring the noise component DVf2, integrating the squared value, and dividing the integrated value by the number of samples. When the dispersion value is less than a preset first dispersion threshold value, the brake ECU 60 sets a bad road index to "0 (zero)". When the dispersion value is greater than or equal to the first dispersion threshold value and less than a preset second dispersion threshold value, which is preset to be greater than the first dispersion threshold value, the brake ECU 60 sets the bad road index to "1". When the dispersion value is greater than or equal to the second dispersion threshold value and less than a third dispersion threshold value, which is preset to be greater than the second dispersion threshold value, the brake ECU 60 sets the bad road index to "2", and when the dispersion value is greater than or equal to the third dispersion threshold value, the brake ECU 60 sets the bad road index to "3". The dispersion threshold values are used to set the bad road index of "0 (zero)" to "3" in accordance with the magnitude of the dispersion value and are preset by an experiment or a simulation. In this manner, as the unevenness degree of a road surface increases, the bad road index is set at a greater value. Therefore, in the present embodiment, the brake ECU 60 also functions as a bad road index acquisition unit. When the bad road index is "0 (zero)", it is determined that the road surface is good, or that the road is not a bad road.

Next, a BA initiation determination processing routine of step S14 will be described with reference to the flowcharts shown in FIGS. 10, 11 and 12 and the timing charts shown in FIGS. 5, 16, 17, 18 and 19.

The BA initiation determination processing routine is executed when the brake switch SW1 is ON. In the BA initiation determination processing routine, the brake ECU 60 determines whether or not the bad road index Nrw acquired in step S11 is "0 (zero)" (step S30). Accordingly, in the present embodiment, the brake ECU 60 also functions as an outer disturbance determination unit that determines whether a vibration component based on outer disturbance (i.e., bad road) is included in the vehicle body deceleration DV. Step S30 corresponds to an outer disturbance determining step. When the bad road index Nrw is "0 (zero)" (step S30: YES) the brake ECU 60 determines that the road surface is good, and sets a bad road determination correction value DVbad to "0 (zero)" (step S31). The bad road determination correction value DVbad is used to correct the first deceleration determination value DV_st. Subsequently, the brake ECU 60 sets a bad road correction flag FLG1 to OFF (step S32) and proceeds to step S39, which will be described below.

If the bad road index Nrw is not "0 (zero)" (step S30: NO), the brake ECU 60 determines whether the bad road index Nrw is "1" (step S33). When the bad road index Nrw is "1" (step S33: YES), the brake ECU 60 determines that the road surface is a slightly bad and sets the bad road determination correction value DVbad to a first correction value KDVbad1 (e.g., 0.2 G) (step S34). Subsequently, the brake ECU 60 sets the bad road correction flag FLG1 to ON (step S35) and proceeds to step S39, which will be described below.

When the bad road index Nrw is not "1" (step S33: NO), the brake ECU 60 determines whether the bad road index Nrw is "2" (step S36). When the bad road index Nrw is "2" (step S36: YES), the brake ECU 60 determines that the road surface is a normal bad road and sets the bad road determination correction value DVbad to a second correction value KDVbad2 (e.g., 0.4 G), which is greater than the first correction value KDVbad1 (step S37). Subsequently, the brake ECU 60 proceeds to step S35, which is described above. When the bad road index Nrw is not "2" (step S36: NO), the bad road index Nrw is "3". Thus, the brake ECU 60 determines that the road surface is an extremely bad road and sets the bad road determination correction value DVbad to a third correction value KDVbad3 (e.g., 0.6 G), which is greater than the second correction value KDVbad2 (step S38). Subsequently, the brake ECU 60 proceeds to step S35, which is described above. In the present embodiment, a larger unevenness degree of the road surface, or a larger bad road index Nrw, sets a larger bad road determination correction value DVbad.

In step S39, the brake ECU 60 increments a first determination timer T1 by "1". The brake ECU 60 determines whether or not the first determination timer T1 has exceeded a first time determination value T1th (e.g., 67) (step S40). The braking control processing routine is executed in predetermined time cycles (e.g., 6 milliseconds). Hence, step S40 is performed to determine whether the time corresponding to the first determination timer T1 exceeds a determination time T400 (e.g., 402 milliseconds), which is obtained by multiplying the first time determination value T1th by a predetermined time (see FIG. 4). When the first determination timer T1 is less than or equal to the first time determination value T1th (step S40: NO), the brake ECU 60 acquires, as a first difference value DVsub1, an absolute value of the difference between the vehicle body deceleration DV calculated in step S23 and the leveled vehicle body deceleration DVf1 calculated in step S25 (step S41).

Subsequently, the brake ECU 60 determines whether an integration permission flag FLGs is OFF and whether the previous difference value DVsub1b is greater than the current first difference value DVsub1 (step S421). The integration permission flag FLGs is used to integrate the top value (or value close to the top value) of the first difference value DVsub1, which changes in a substantially cyclic manner. The previous difference value DVsub1b is a first difference value DVsub1 calculated at the previous timing.

When the integration permission flag FLGs is OFF and the previous difference value DVsub1b is greater than the current first difference value DVsub1 (step S421: YES), the brake ECU 60 proceeds to step S422. In step S422, the brake ECU 60 integrates the first difference value DVsub1 calculated in step S41 with an amplitude integration value σwDV of the vehicle body deceleration, increments the number CT1 of integrating operations by "1", and sets the integration permission flag FLGs to ON (step S422). Subsequently, the brake ECU 60 subtracts the G sensor value G calculated in step S27 from the leveled vehicle body deceleration DVfl, acquires the second difference value DVsub2 (step S43), and integrates the second difference value DVsub2 calculated in step S43 with a gradient integration value σsG (step S441). The brake ECU 60 sets the previous difference value DVsub1b as the current first difference value DVsub1 (step S442) and proceeds to step S50, which will be described below.

When at least one of a condition that the integration permission flag FLGs is OFF and a condition that the previous difference value DVsub1b is greater than the current first difference value DVsub1 is not satisfied (step S421: NO), the brake ECU 60 determines whether the previous difference value DVsub1b is less than or equal to the current first difference value DVsub1 (step S423). When the previous difference value DVsub1b is greater than the current first difference value DVsub1 (step S423: NO), the brake ECU 60 proceeds to step S43, which is described above. When the previous difference value DVsub1b is less than or equal to the current first difference value DVsub1 (step S423: YES), the brake ECU 60 sets the integration permission flag FLGs to OFF (step S424) and proceeds to step S43, which is described above.

When the first determination timer T1 exceeds the first time determination value T1th (step S40: YES), the brake ECU 60 divides the acquired amplitude integration value σwDV of the vehicle body deceleration by the renewed number CT1 of integration operations until the first determination timer T1 exceeds the first time determination value T1th and acquires an amplitude W_DV of the vehicle body deceleration (step S45). The amplitude W_DV is used when the first deceleration determination value DV_st is corrected. Accordingly, in the present embodiment, the brake ECU 60 also functions as an amplitude calculator.

Subsequently, the brake ECU 60 determines whether the calculated amplitude W_DV is less than a preset amplitude reference value KW (step S46). Detection signals from the wheel speed sensors SE2 to SE5 used for acquiring the vehicle body deceleration DV include a certain amount of fluctuation (i.e., slight cyclic fluctuation) even if there is no outer disturbance as described above. There is no need to correct the first deceleration determination value DV_st based on such a slight cyclic fluctuation. When the road surface along which the vehicle is traveling is a so-called gravel road over which gravel is spread, the bad road index Nrw often becomes "0 (zero)". In such a case, even if it is determined that the road surface is good, the vibration component based on slight unevenness of the road surface is included in the vehicle body deceleration DV. Hence, in the present embodiment, the amplitude reference value KW is set as a determination value used to determine whether the influence of outer disturbance is included in the vehicle body deceleration DV.

When the amplitude W_DV is less than the amplitude reference value KW (step S46: YES), the brake ECU 60 sets the amplitude W_DV to "0 (zero)" (step S47), and proceeds to step S48. If the amplitude W_DV is greater than or equal to the amplitude reference value KW (step S46: NO), the brake ECU 60 proceeds to step S48 without performing step S47.

In step S48, the brake ECU 60 divides the acquired gradient integration value σsG by the first determination timer T1 and acquires a gradient estimated value (gradient information) Gslope. The gradient estimated value Gslope is the gradient of the road surface and used when the first deceleration determination value DV_st and the second deceleration determination value G_st are corrected. Accordingly, in the present embodiment, the brake ECU 60 also functions as a gradient information acquisition unit, which acquires the gradient estimated value Gslope as gradient information. Step S48 corresponds to a gradient information acquiring step. Subsequently, the brake ECU 60 sets the first determination timer T1, the number CT1 of the integrating operations, the amplitude integration value σwDV of the vehicle body deceleration, and the gradient integration value σsG to "0 (zero)" (step S49) and then proceeds to following step S50.

Figure 4:
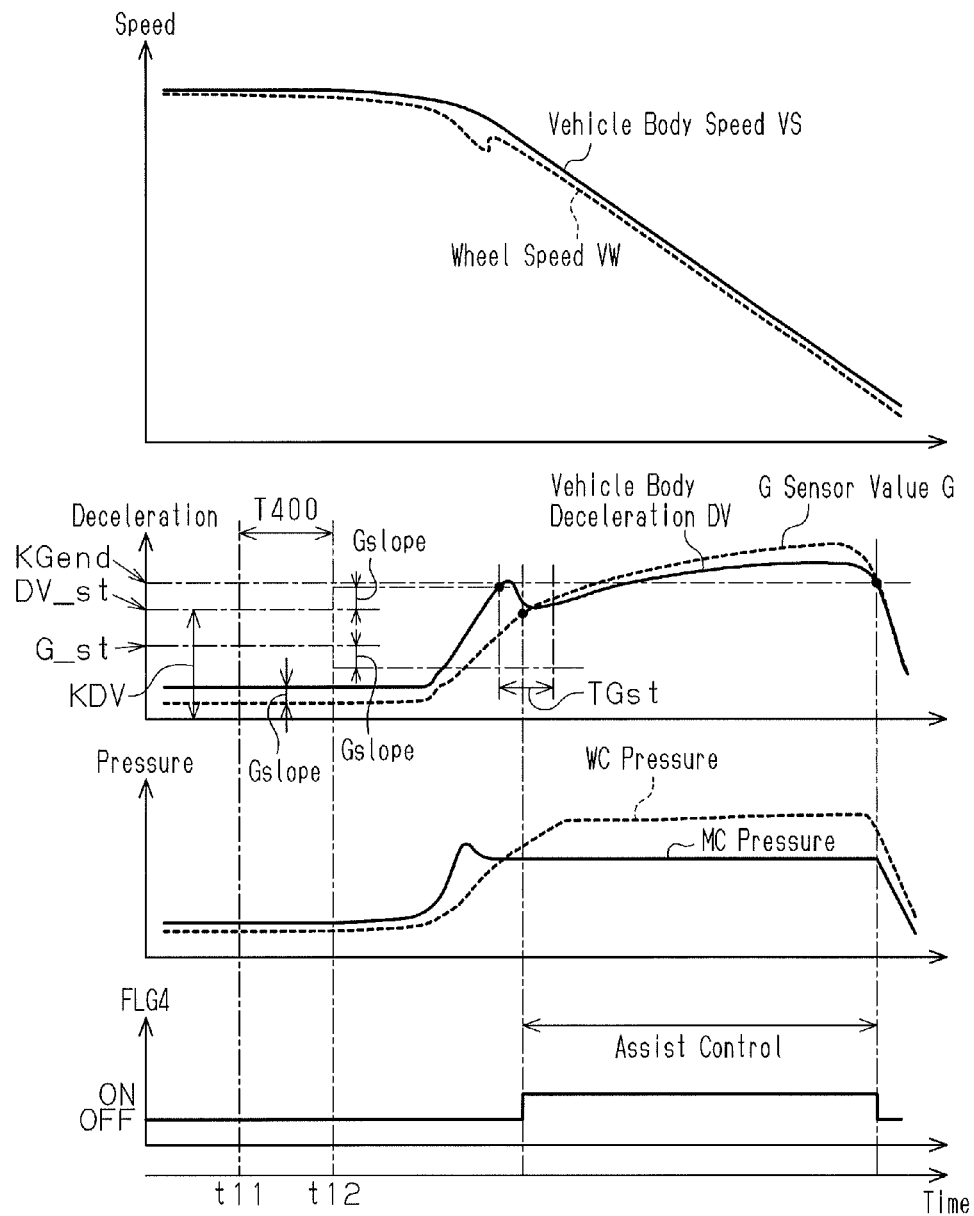
FIG. 4 is a timing chart illustrating a case in which the vehicle is traveling on a sloped road directed uphill.

More specifically, in the timing chart shown in FIG. 4, the difference values DVsub1 and DVsub2 are acquired in predetermined time cycles from the first timing t11, at which the acquisition operation of the difference values DVsub1 and DVsub2 is started, to a second timing t12, at which determination time T400 elapses from the first timing t11. The gradient estimated value Gslope used to correct the deceleration determination values DV_st and G_st is set to an average value of the second difference values DVsub2 acquired during the determination time T400. The amplitude W_DV for correcting the deceleration determination value DV_st is set based on the first difference value DVsub1 acquired during the determination time T400. That is, the amplitude W_DV and the gradient estimated value Gslope are renewed for every determination time T400.

Figure 10:
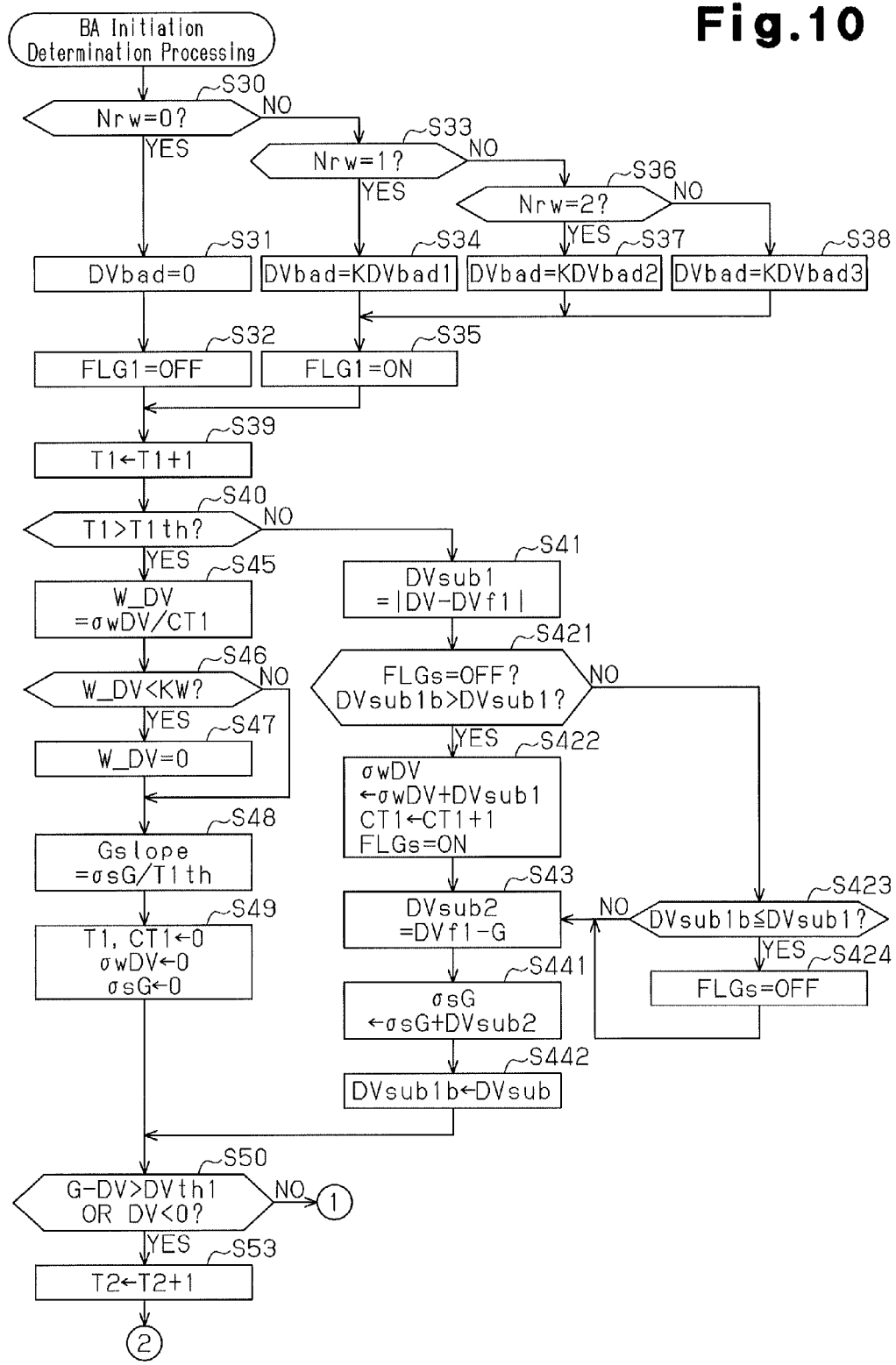
FIG. 10 is a flowchart illustrating a BA initiation determination processing routine (first part)
Figure 11:
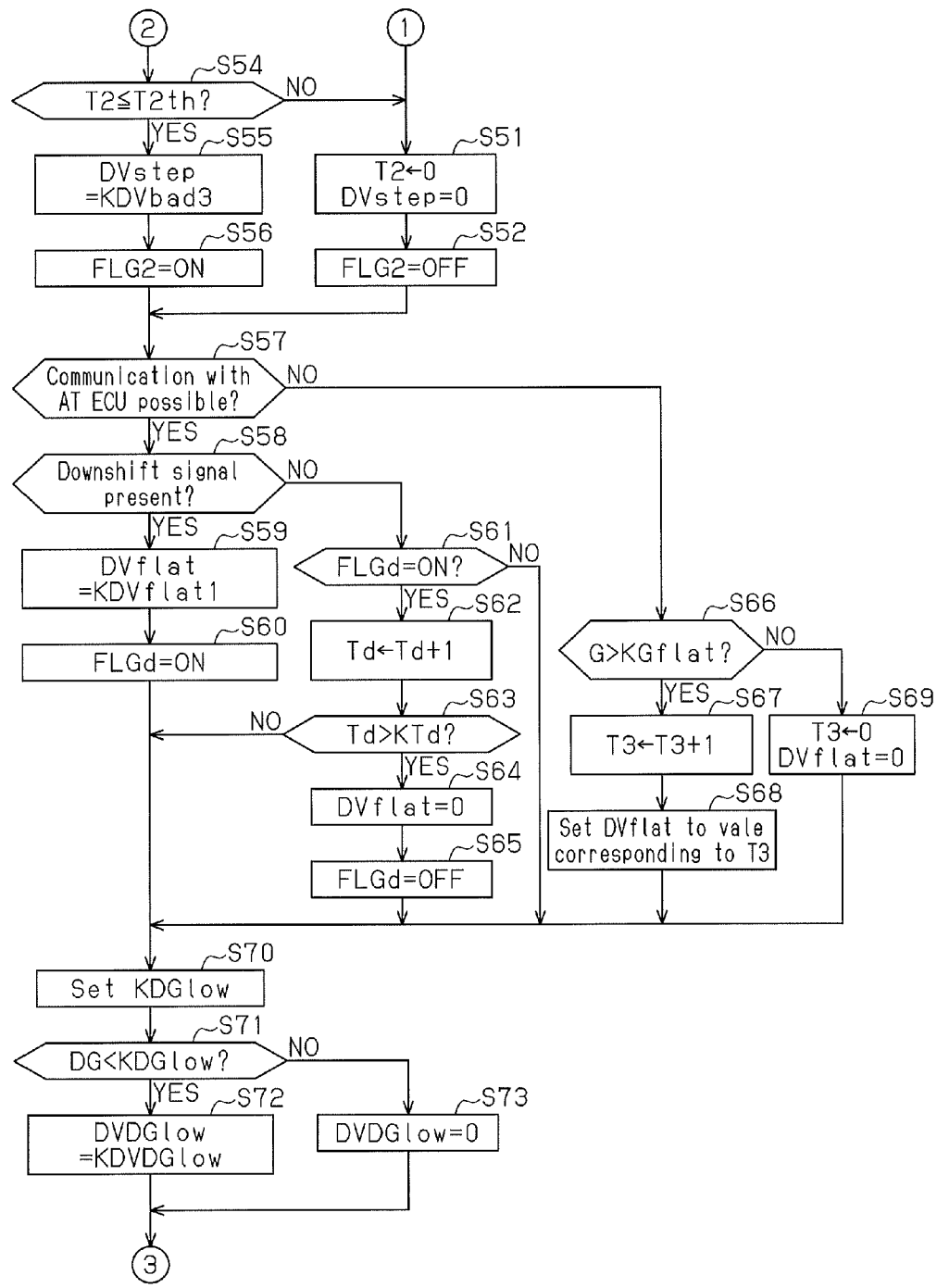
FIG. 11 is a flowchart illustrating the BA initiation determination processing routine (middle part)

Returning to the flowchart shown in FIG. 10, the brake ECU 60 determines in step S50 whether or not the vehicle is moving over a bump on a road surface. A state in which wheel speeds VW of the wheels FR, FL, RR, and RL change when the vehicle moves over a bump will now be described with reference to the timing chart shown in FIG. 16. When the vehicle moves over a bump, the front wheels FR and FL first move over the bump. In this state, the wheel speeds VW of the front wheels FR and FL are suddenly decelerated because the front wheels FR and FL come into contact with the bump (first timing t31). Then, the center of gravity of the vehicle is vertically changed due to the contact of the front wheels FR and FL with the bump. As a result, the wheel speeds VW of the front wheels FR and FL are changed in accordance with the vertical change in the center of gravity. That is, when the center of gravity of the vehicle is moved upward, the contact area between the road surface and the front wheels FR and FL becomes small. Hence, the traction force between the front wheels FR and FL and the road surface becomes small, and the wheel speeds VW of the front wheels FR and FL are accelerated. If the wheel speeds VW of the front wheels FR and FL start accelerating in this manner, the vehicle body deceleration DV starts to decrease (second timing t32).

Then, when the center of gravity of the vehicle starts moving downward and the contact area between the road surface and the front wheels FR and FL increases, the traction force between the road surface and the front wheels FR and FL increases and the wheel speeds VW of the front wheels FR and FL start to decelerate. From the third timing t33, at which a gradient change of the vehicle body deceleration DV becomes gradual, the vehicle body deceleration DV becomes less than the G sensor value G. Hence, after the third timing t33, the vehicle body deceleration DV becomes greater toward the G sensor value G in recoil from the preceding state. As shown at the fourth timing t34, the vehicle body deceleration DV may become greater than the G sensor value G. In this case, if the first deceleration determination value DV_st is not corrected, the vehicle body deceleration DV becomes greater than or equal to the first deceleration determination value DV_st, and the assist control may start unintentionally. Hence, it is preferable that the first deceleration determination value DV_st be corrected before the fourth timing t34.

Figure 17:
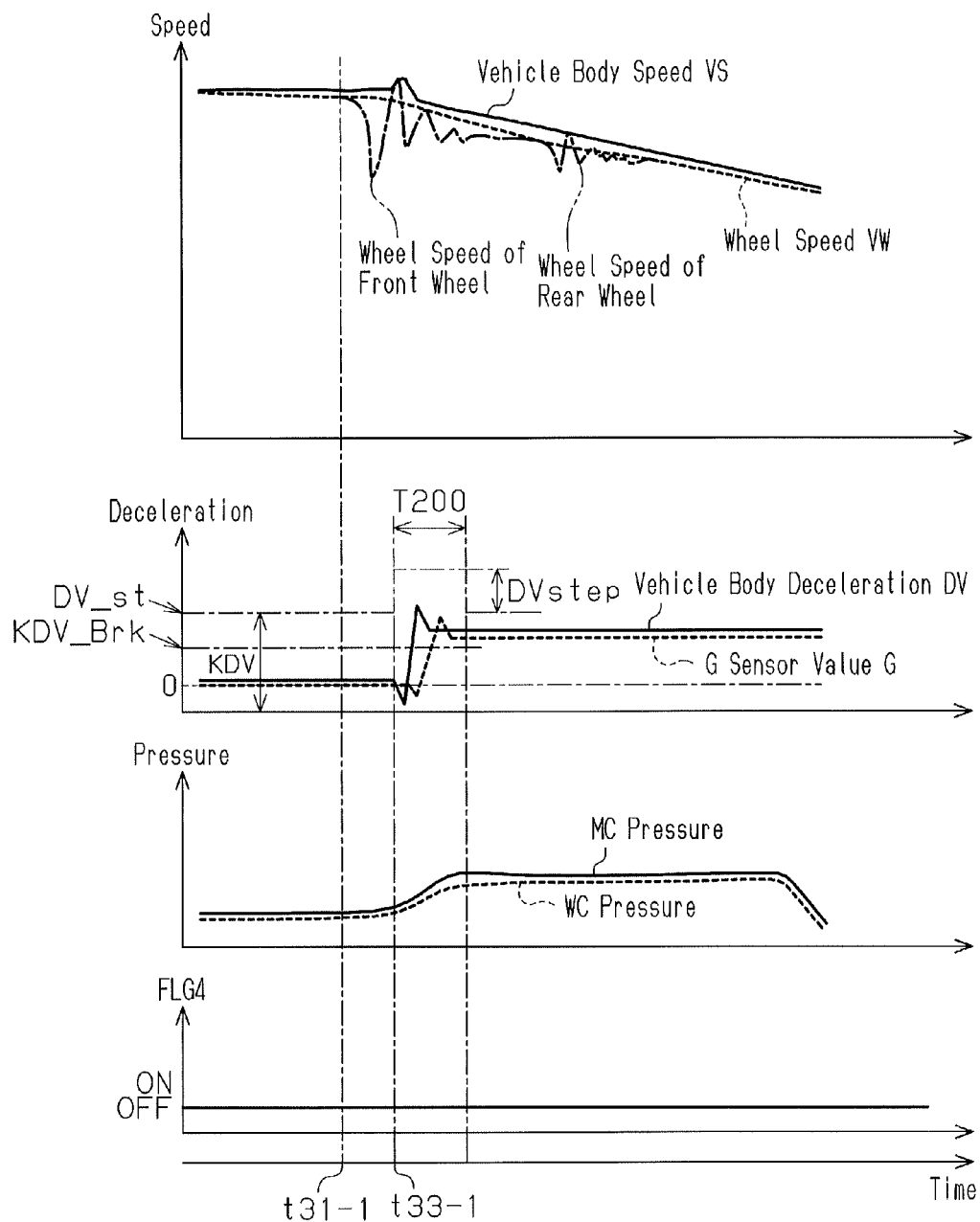
FIG. 17 is a timing chart illustrating a case in which the vehicle moves over a bump on a road.

When the driver's depression operation amount of the brake pedal 31 is small, the vehicle body deceleration DV changes as shown in the timing chart of FIG. 17. That is, when the vehicle moves over a bump, the front wheels FR and FL come into contact with the bump. This suddenly decelerates the wheel speeds VW of the front wheels FR and FL (first timing t31-1). Then, the center of gravity of the vehicle is vertically changed due to the contact of the front wheels FR and FL with the bump. As a result, the wheel speeds VW of the front wheels FR and FL are changed in accordance with the vertical change in the center of gravity. That is, when the center of gravity of the vehicle is moved upward, the contact area between the road surface and the front wheels FR and FL becomes small. Hence, the traction force between the front wheels FR and FL and the road surface becomes small, and the wheel speeds VW of the front wheels FR and FL are accelerated. If the wheel speeds VW of the front wheels FR and FL start to accelerate, the vehicle body deceleration DV starts to decrease.

In this state, if the vehicle body deceleration DV before the wheel speeds VW of the front wheels FR and FL start to accelerate is small, the vehicle body deceleration DV immediately becomes a negative value (third timing t33-1). After the third timing t33-1, the vehicle body deceleration DV is increased toward the G sensor value G in recoil from the preceding state. In this case, if the first deceleration determination value DV_st is not corrected, the vehicle body deceleration DV becomes greater than or equal to the first deceleration determination value DV_st, and the assist control may start unintentionally. Thus, it is preferable that the first deceleration determination value DV_st be corrected at the third timing t33-1.

Returning back to the flowchart shown in FIG. 10, in the present embodiment, the determination processing in step S50 is performed. Specifically, the brake ECU 60 determines whether one of the following two conditions is satisfied.

(First Condition) A value (=G−DV) obtained by subtracting the vehicle body deceleration DV from the G sensor value G exceeds a preset deceleration specified value DVth1 (e.g., 0.2 G).

(Second Condition) The vehicle body deceleration DV is less than "0 (zero)".

More specifically, once the G sensor value G becomes greater than the total of the vehicle body deceleration DV and the deceleration specified value DVth1, the probability of the vehicle body deceleration DV suddenly increasing afterward is high. If the vehicle body deceleration DV becomes a negative value, this indicates that the vehicle body speed VS has erroneously been determined as accelerating even though a braking operation is being performed. Hence, when one of the above conditions is satisfied, it is determined that the vehicle moved over a bump on a road. Therefore, in the present embodiment, the brake ECU 60 also functions as an outer disturbance determination unit that determines whether or not a vibration component based on outer disturbance (i.e., bump) is included in vehicle body deceleration (first estimated vehicle body deceleration) DV. Step S50 corresponds to an outer disturbance determining step. A case in which the first condition is not satisfied and the second condition is satisfied can occur when the vehicle moves over a bump in a state in which the driver's depression operation amount of the brake pedal 31 is small.

When both conditions are not satisfied (step S50: NO), the brake ECU 60 determines that the vehicle has not moved over a bump and sets a second determination timer T2 and a bump determination correction value DVstep to "0 (zero)" (step S51). The brake ECU 60 sets a bump correction flag FLG2 to OFF (step S52) and proceeds to step S57, which will be described below.

When the first or the second condition is satisfied (step S50: YES), the brake ECU 60 determines that the vehicle moved over a bump and increments the second determination timer T2 by "1" (step S53). Subsequently, the brake ECU 60 determines whether the second determination timer T2 is less than or equal to a preset second time determination value T2th (e.g., 34) (step S54). The braking control processing routine is executed in predetermined time cycles (e.g., 6 milliseconds). Hence, it is determined in step S53 whether the time corresponding to the second determination timer T2 has exceeded a determination time T200 (e.g., 204 milliseconds) obtained by multiplying the second time determination value T2th by a predetermined time (see FIGS. 16 and 17). When the second determination timer T2 exceeds the second time determination value T2th (step S54: NO), the brake ECU 60 proceeds to step S51. That is, the brake ECU 60 sets the bump determination correction value DVstep which is used to correct the first deceleration determination value DV_st to "0 (zero)". Therefore, in the present embodiment, the second time determination value T2th corresponds to a deceleration specified time.

When the second determination timer T2 is less than or equal to the second time determination value T2th (step S54: YES), the brake ECU 60 sets the bump determination correction value DVstep to a third correction value KDVbad3 (e.g., 0.6 G) (step S55). Subsequently, the brake ECU 60 sets the bump correction flag FLG2 to ON (step S56) and proceeds to following step S57.

In step S57, the brake ECU 60 determines whether it is possible to communicate with the AT ECU 23, which serves as another control unit (transmission control unit) that controls the automatic transmission 21. When it is not possible to communicate with the AT ECU 23 (step S57: NO), the brake ECU 60 proceeds to step S66, which will be described below. When it is possible to communicate with the AT ECU 23 (step S57: YES), the brake ECU 60 determines whether a downshift signal instructing the execution of a downshifting operation has been received from the AT ECU 23 (step S58). When the downshift signal has not yet been received (step S58: NO), the brake ECU 60 proceeds to step S61, which is will described below. When the downshift signal has been received (step S58: YES), the brake ECU 60 sets, to the maximum correction value KDVflat1 (e.g., 0.5 G), a downshift determination correction value DVflat that is used to correct the first deceleration determination value DV_st (step S59). Accordingly, in the present embodiment, the brake ECU 60 also functions as an outer disturbance determination unit that determines whether or not a vibration component based on outer disturbance resulting from the downshifting operation of the automatic transmission 21 is included in the vehicle body deceleration (first estimated vehicle body deceleration) DV. Step S58 corresponds to an outer disturbance determining step. Then, the brake ECU 60 sets a downshift flag FLGd to ON (step S60) and shifts the processing to step S70, which will be described below.

In step S61, the brake ECU 60 determines whether or not the downshift flag FLGd is ON. If the downshift flag FLGd is OFF (step S61: NO), the brake ECU 60 proceeds to step S70, which will be described below. When the downshift flag FLGd is ON (step S61: YES), the brake ECU 60 increments a downshift timer Td by "1" (step S62). The brake ECU 60 determines whether the downshift timer Td exceeds a preset gear shifting completion determination value KTd (e.g., 17) (step S63). The braking control processing routine is executed in predetermined time cycles (e.g., 6 milliseconds). Thus, it is determined in step S62 whether the time corresponding to the downshift timer Td exceeds the determination time (e.g., 102 milliseconds) obtained by multiplying the gear shifting completion determination value KTd by a predetermined time. Accordingly, in the present embodiment, the gear shifting completion determination value KTd corresponds to a gear shifting specified time.

When the downshift timer Td is less than or equal to the gear shifting completion determination value KTd (step S63: NO), the brake ECU 60 proceeds to step S70, which will be described below. When the downshift timer Td exceeds the gear shifting completion determination value KTd (step S63: YES), the brake ECU 60 sets the downshift determination correction value DVflat to "0 (zero)" (step S64) and sets the downshift flag FLGd to OFF (step S65). The brake ECU 60 proceeds to step S70, which will be described below.

A downshift determination value (high depression force determination reference value) KGflat (e.g., 0.3 G) is set to determine whether a driver's depression operation amount of the brake pedal 31 is large. In step S66, the brake ECU 60 determines whether the G sensor value G calculated in step S27 exceeds the downshift determination value KGflat. If the G sensor value G exceeds the downshift determination value KGflat (step S66: YES), the brake ECU 60 increments the third determination timer T3 by "1" (step S67). The third determination timer T3 corresponds to the duration time in a state in which the G sensor value G exceeds the downshift determination value KGflat. Accordingly, in the present embodiment, the brake ECU 60 also functions as a duration time acquisition unit that acquires the third determination timer T3 as a duration time in a state in which the G sensor value (second estimated vehicle body deceleration) G exceeds the downshift determination value (high depression force determination reference value) KGflat.

The brake ECU 60 sets the downshift determination correction value DVflat to a value corresponding to the third determination timer T3 using the first map (see FIG. 6) (step S68) and proceeds to step S70, which will be described below. More specifically, when the third determination timer T3 is less than or equal to the first time T3_1, the downshift determination correction value DVflat is set to "0 (zero)". When the third determination timer T3 exceeds the first time T3_1, the downshift determination correction value DVflat is set to a value greater than "0 (zero)". That is, the first time T3_1 corresponds to a high depression force specified time. Accordingly, in the present embodiment, the brake ECU 60 also functions as an outer disturbance determination unit which determines whether or not a vibration component based on outer disturbance resulting from a downshifting operation of the automatic transmission 21 may be included in the vehicle body deceleration (first estimated vehicle body deceleration) DV. Step S68 corresponds to an outer disturbance determining step. When the G sensor value G is less than the downshift determination value KGflat (step S66: NO), the brake ECU 60 sets the third determination timer T3 and the downshift determination correction value DVflat to "0 (zero)" (step S69) and proceeds to following step S70.

In step S70, the brake ECU 60 sets, using the second map (see FIG. 7), the gradient change reference value KDGlow used to determine whether or not a road surface along which the vehicle is traveling has changed to an uphill slope. Specifically, the brake ECU 60 subtracts the gradient change DG of the G sensor value calculated in step S28 from the gradient change DDV of the vehicle body deceleration calculated in step S24 to set a value based on the subtraction result as the gradient change reference value KDGlow. Accordingly, in the present embodiment, the brake ECU 60 also functions as a reference value setting unit that sets the gradient change reference value KDGlow. Then, the brake ECU 60 determines whether the gradient change DG of the G sensor value calculated in step S28 is less than the gradient change reference value KDGlow, which is set in step S70 (step S71). When the gradient change DG is less than the gradient change reference value KDGlow (step S71: YES), the brake ECU 60 determines that the road surface has changed to an uphill road and sets a gradient change correction value DVDGlow, which is used to correct the first deceleration determination value DV_st, to a preset maximum gradient correspondence value KDVDGlow (e.g., 0.45 G) (step S72). The maximum gradient correspondence value KDVDGlow is a deceleration component corresponding to the maximum value (e.g., 50%) of a road surface gradient on which the vehicle can travel. Then, the brake ECU 60 proceeds to step S74, which will be described below. When the gradient change DG is greater than or equal to the gradient change reference value KDGlow (step S71: NO), the brake ECU 60 determines that the road surface has not changed to an uphill slope, sets the gradient change correction value DVDGlow to "0 (zero)" (step S73), and shifts the processing to following step S74.

In step S74, the brake ECU 60 determines whether the bump correction flag FLG2 is ON. When the bump correction flag FLG2 is ON (step S74: YES), the brake ECU 60 sets a deceleration correction value DVtp as the bump determination correction value DVstep set in step S55 (step S75) and proceeds to step S79. When the bump correction flag FLG2 is OFF (step S74: NO), the brake ECU 60 determines whether the bad road correction flag FLG1 is ON (step S76). When the bad road correction flag FLG1 is ON (step S76: YES), the brake ECU 60 sets the deceleration correction value DVtp to a bad road determination correction value DVbad set in any one of steps S34, S37 and S38 and proceeds to step S79, which will be described below. When the bad road correction flag FLG1 is OFF (step S76: NO), the brake ECU 60 sets the deceleration correction value DVtp to the amplitude W_DV, which is set in step S45 or S47, and proceeds to following step S79.

In step S79, the brake ECU 60 sets the first deceleration determination value DV_st. Specifically, the brake ECU 60 adds the deceleration correction value DVtp, the gradient estimated value Gslope, the downshift determination correction value DVflat and the gradient change correction value DVDGlow to a preset basic value KDV (e.g., 0.5 G). Then, the brake ECU 60 sets the added result as the first deceleration determination value DV_st. That is, when it is determined that the vehicle has moved over a bump, the first deceleration determination value DV_st is set to a value that is greater than the basic value KDV by the bump determination correction value DVstep (see FIGS. 16 and 17). When determined that a road surface is a bad road, the first deceleration determination value DV_st is set to a value that is greater than the basic value KDV by a bad road determination correction value DVbad. When it is determined that the road surface is a good road, the first deceleration determination value DV_st is set to a value greater than the basic value KDV by the amplitude W_DV.

The first deceleration determination value DV_st is corrected based on the gradient of the road surface (see FIG. 4). When it is determined that the road surface has changed to an uphill road, the first deceleration determination value DV_st is corrected to a value greater than the basic value KDV by the gradient change correction value DVDGlow (see FIG. 5). When determined that the automatic transmission 21 has performed downshifting or there is a possibility that the automatic transmission 21 has performed downshifting, the first deceleration determination value DV_st is corrected to a value that is greater than the basic value KDV by the downshift determination correction value DVflat. Accordingly, in the present embodiment, the brake ECU 60 also functions as a reference value correction unit. Step S79 corresponds to a reference value correcting step.

The brake ECU 60 sets the second deceleration determination value G_st (step S80). Specifically, the brake ECU 60 subtracts the gradient estimated value Gslope from a preset basic value KGst (e.g., 0.3 G) and sets the subtracted result as the second deceleration determination value G_st (see FIG. 4). The basic value KGst is preset as a determination reference for determining whether a driver's operation amount of the brake pedal 31 has decreased during a period in which assist control is not executed. Subsequently, the brake ECU 60 determines whether the vehicle body deceleration DV calculated in step S23 exceeds the braking determination value KDV_Brk (see FIG. 3) (step S81). When the vehicle body deceleration DV is less than or equal to the braking determination value KDV_Brk (step S81: NO), the brake ECU 60 sets a fourth determination timer T4 and a fifth determination timer T5 to "0 (zero)" and sets a first condition satisfaction flag FLG3 to OFF (step S82). Then, the brake ECU 60 proceeds to step S92, which will be described below.

When the vehicle body deceleration DV exceeds the braking determination value KDV_Brk (step S81: YES), the brake ECU 60 increments the fourth determination timer T4 by "1" (step S83). The fourth determination timer T4 corresponds to the time elapsed from when the vehicle body deceleration DV exceeds the braking determination value KDV_Brk. Subsequently, the brake ECU 60 determines whether the following two conditions are both satisfied (step S84).

(Third Condition) The vehicle body deceleration DV exceeds the first deceleration determination value DV_st.

(Fourth Condition) The fourth determination timer T4 is less than or equal to an elapsed time determination value KT1 (e.g., 10).

The fourth condition can also be referred to as the time elapsed from when the vehicle body deceleration DV exceeds the braking determination value KDV_Brk being less than or equal to the first reference elapsed time TDVst (see FIG. 3). That is, the first reference elapsed time TDVst is a value obtained by multiplying the elapsed time determination value KT1 by a predetermined time (e.g., 6 milliseconds).

When the third and fourth conditions are both satisfied (step S84: YES), the brake ECU 60 determines whether the first condition satisfaction flag FLG3 is OFF (step S85). When the first condition satisfaction flag FLG3 is ON (step S85: NO), the brake ECU 60 shifts the processing to later-described step S88. When the first condition satisfaction flag FLG3 is OFF (step S85: YES), the brake ECU 60 sets the gradient change DDV of the current vehicle body deceleration as a first gradient change DDV1 and sets the first condition satisfaction flag FLG3 to ON (step S86). Then, the brake ECU 60 proceeds to step S88, which will be described below. Therefore, in step S86 of the present embodiment, the gradient change DDV of the vehicle body deceleration acquired when the first condition satisfaction flag FLG3 is set from OFF to ON is acquired as the first gradient change DDV1. In this aspect, step S86 corresponds to a first gradient acquiring step.

When at least one of the third and fourth conditions is not satisfied (step S84: NO), the brake ECU 60 determines whether the first condition satisfaction flag FLG3 is ON (step S87). When the first condition satisfaction flag FLG3 is OFF (step S87: NO), the brake ECU 60 proceeds to step S92, which will be described below. When the first condition satisfaction flag FLG3 is ON (step S87: YES), the brake ECU 60 proceeds to following step S88.

In step S88, the brake ECU 60 increments the fifth determination timer T5 by "1". The fifth determination timer T5 corresponds to the time elapsed from when the first condition satisfaction flag FLG3 is turned ON. Accordingly, in the present embodiment, the brake ECU 60 also functions as an elapsed time acquisition unit that acquires the fifth determination timer T5 as the time elapsed from when the first gradient change DDV1 is acquired. Subsequently, the brake ECU 60 determines whether the following two conditions are both satisfied (step S89).

(Fifth Condition) The G sensor value G exceeds the second deceleration determination value G_st.

(Sixth Condition) The fifth determination timer T5 is greater than specified waiting time KT_w (e.g., 8) and less than or equal to an initiation time determination reference value KT2 (e.g., 17).

The initiation time determination reference value KT2 corresponds to the second reference elapsed time TGst (see FIG. 3). That is, the second reference elapsed time TGst is a value obtained by multiplying the initiation time determination reference value KT2 by predetermined time (e.g., 6 milliseconds). In the present embodiment, the initiation time determination reference value KT2 is a specified value that is set based on characteristics of a vehicle. The specified waiting time KT_w corresponds to a depression force determination time reference value.

When at least one of the fifth and sixth conditions is not satisfied (step S89: NO), the brake ECU 60 proceeds to step S92, which will be described below. When the fifth and sixth conditions are both satisfied (step S89: YES), the brake ECU 60 sets the gradient change DDV of the current vehicle body deceleration as a second gradient change DDV2 and determines whether or not the second gradient change DDV2 is greater than or equal to the first gradient change DDV1 (step S90). Accordingly, in the present embodiment, step S90 corresponds to a second gradient acquisition step.

Here, a comparison between a case in which the depression force applied by the driver to the brake pedal 31 is normal (low) and a case in which the depression force is high will be described with reference to the timing charts shown in FIGS. 18 and 19. FIG. 19 shows a state in which ABS control is executed.

Figure 18:
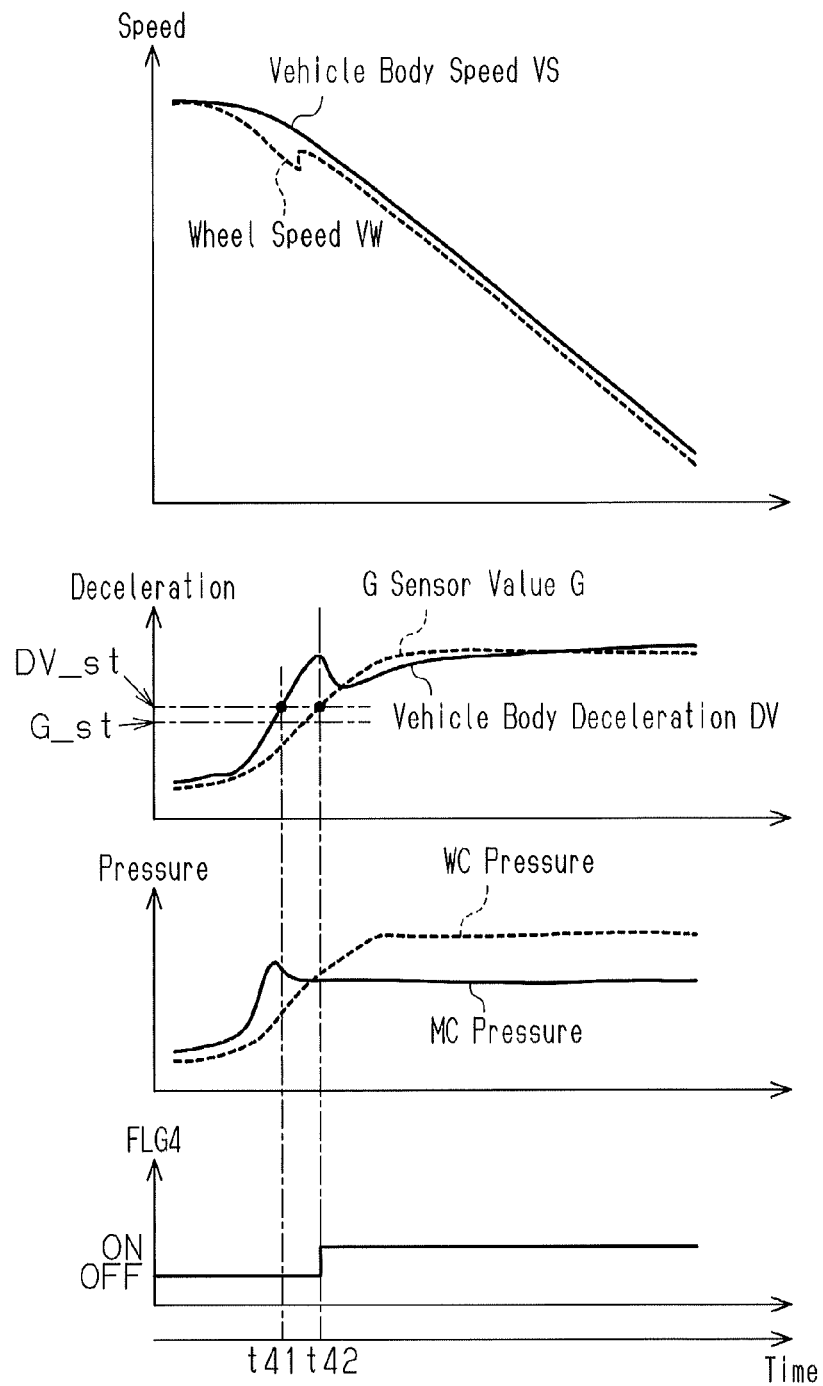
FIG. 18 is a timing chart illustrating a case in which the driver applies a normal depression force to the brake pedal.
Figure 19:
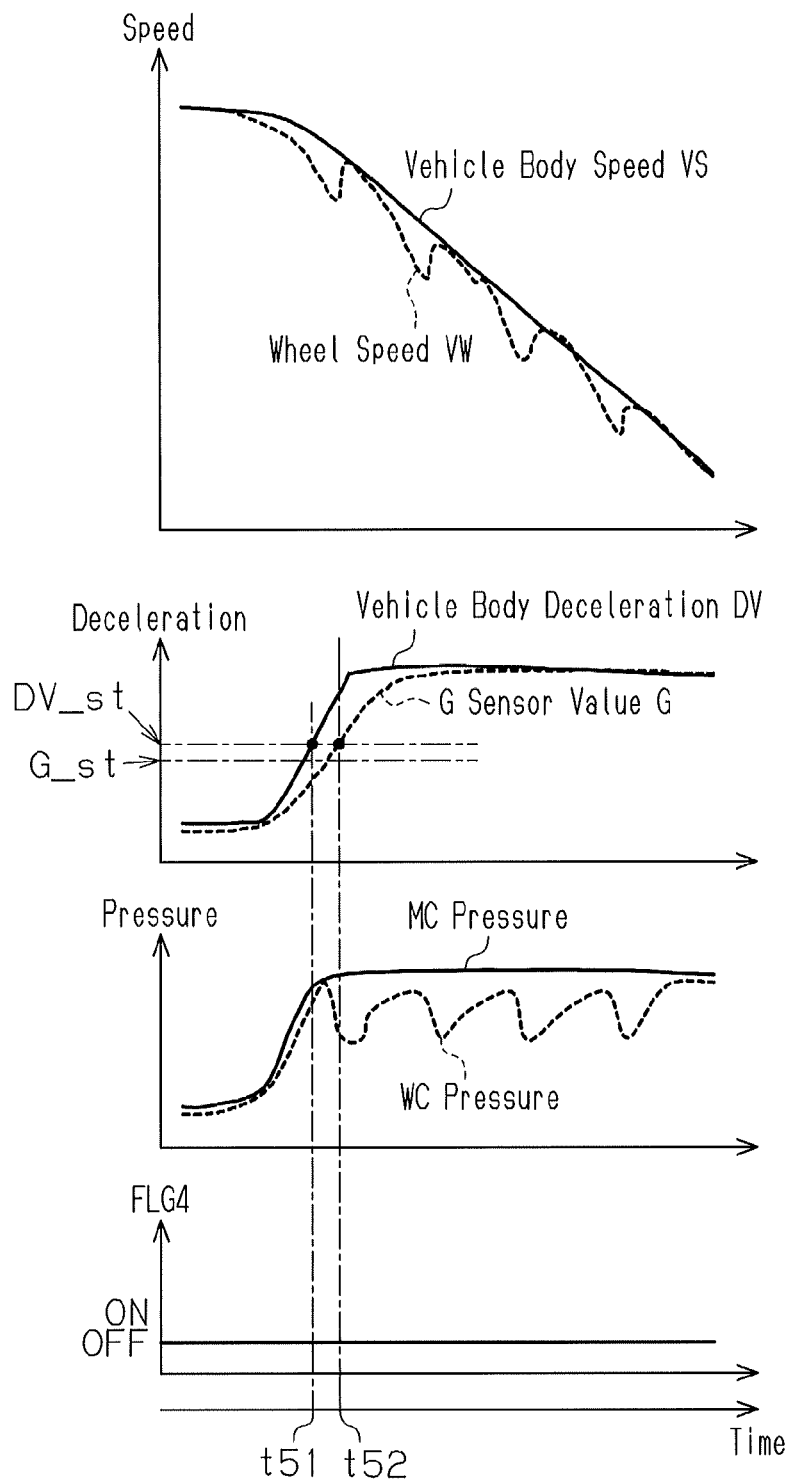
FIG. 19 is a timing chart illustrating a case in which the driver applies a large depression force to the brake pedal.

When the depression force is normal, as shown in the timing chart of FIG. 18, the vehicle body deceleration DV is changed by a change in the braking force applied to the wheels FR, FL, RR, and RL due to a recoil force from the brake pedal 31, increased until the second timing t42, and decreased after the second timing t42. The second timing t42 is a timing when the fifth and sixth conditions are both satisfied. When the depression force is normal, the probability is high that the second gradient change DDV2 acquired at the second timing t42 will become less than the first gradient change DDV1 acquired at the first timing t41 at which the vehicle body deceleration DV exceeds the first deceleration determination value DV_st.

When the depression force is maintained at a high level, as shown in the timing chart in FIG. 19, the depression force is sufficiently greater than the reaction force from the brake pedal 31. Thus, the vehicle body deceleration DV, which is changed by the change in the braking force applied to the wheels FR, FL, RR, and RL, takes a long time to decrease. Hence, when the depression force is maintained at a high level, the probability is high that the second gradient change DDV2 acquired at the second timing t52, at which the fifth and sixth conditions are satisfied, will become greater than or equal to the gradient change DDV (first gradient change DDV1) at the first timing t51 is high. Hence, in this embodiment, when the second gradient change DDV2 is greater than or equal to the first gradient change DDV1, it is determined that a decrease in the necessity of the assist control increases the depression force applied by the driver to the brake pedal 31.

Figure 12:
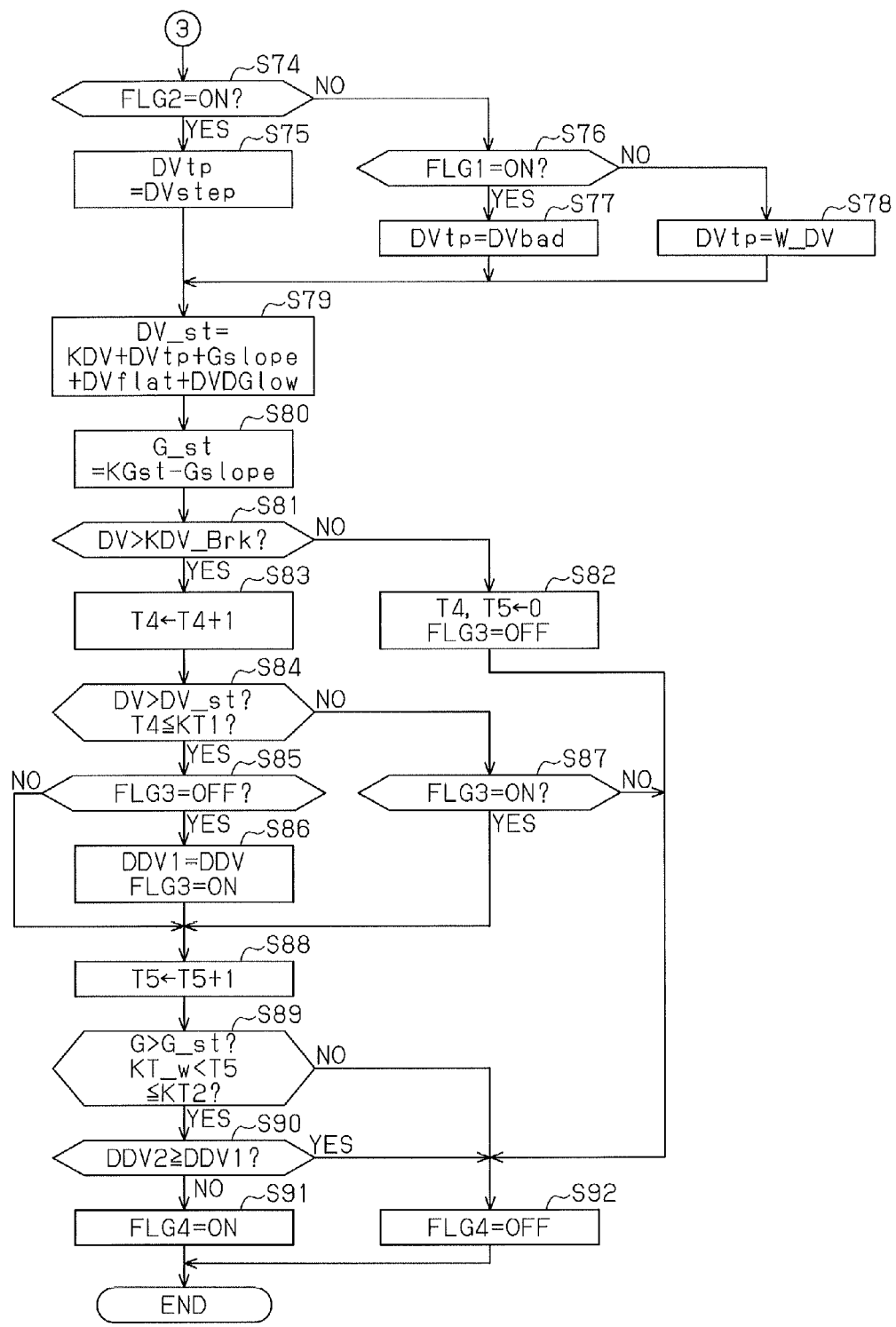
FIG. 12 is a flowchart illustrating the BA initiation determination processing routine (last half)

Returning to the flowchart shown in FIG. 12, when the second gradient change DDV2 is greater than or equal to the first gradient change DDV1 (step S90: YES), the brake ECU 60 determines that there is no need to execute the assist control or the necessity of the assist control is low and proceeds to step S92, which will be described below. Therefore, in the present embodiment, the brake ECU 60 also functions as a depression force determination unit that determines whether or not the depression force when a driver depresses the brake pedal 31 is high. Step S90 corresponds to a depression force determining step. When the second gradient change DDV2 is less than the first gradient change DDV1 (step S90: NO), the brake ECU 60 determines that it is necessary to execute the assist control, and sets the assist control condition satisfaction flag FLG4 to ON to indicate that the initiating condition of the assist control has been satisfied (step S91). Then, the brake ECU 60 completes the BA initiation determination processing routine.

In step S92, the brake ECU 60 sets the assist control condition satisfaction flag FLG4 to OFF and then completes the BA initiation determination processing routine.

Figure 13:
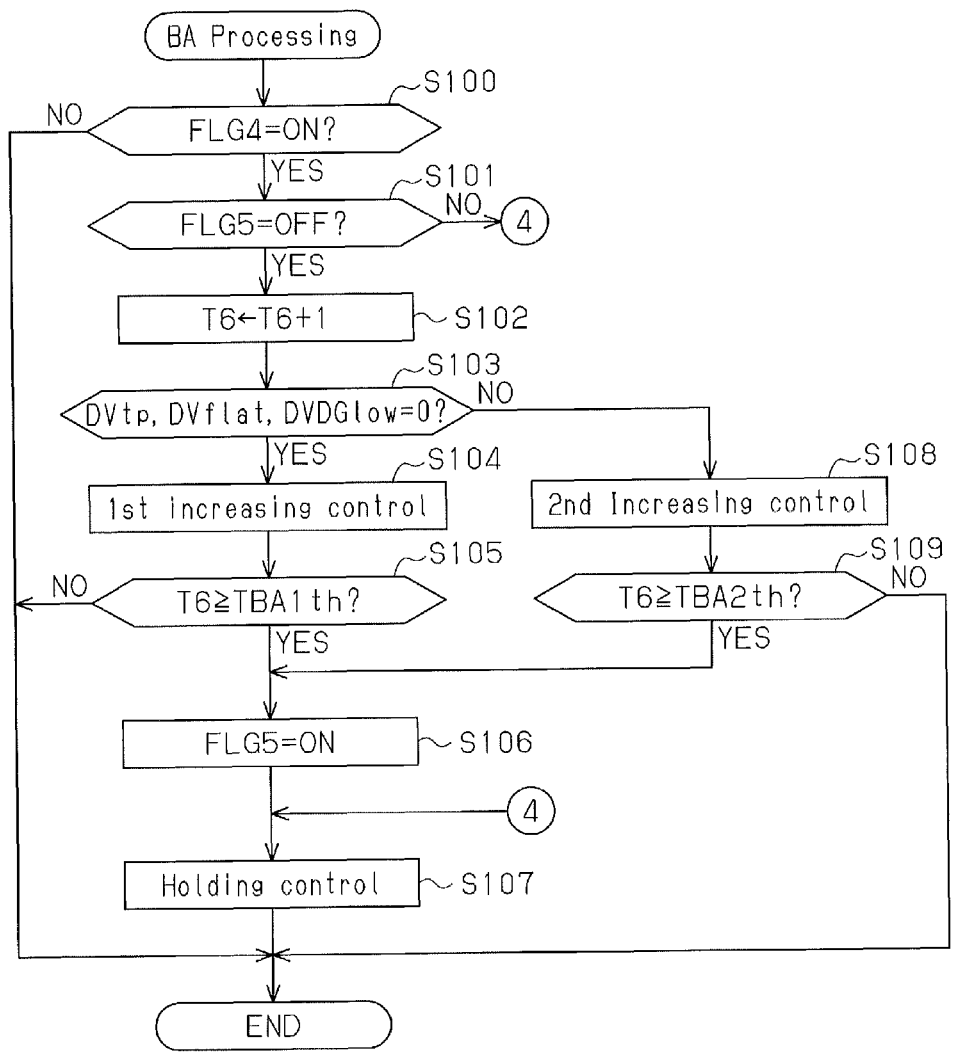
FIG. 13 is a flowchart illustrating a BA processing routine.

Next, the BA processing routine in step S15 will be described with reference to the flowchart shown in FIG. 13.

In the BA processing routine, the brake ECU 60 determines whether the assist control condition satisfaction flag FLG4 is ON (step S100). When the assist control condition satisfaction flag FLG4 is OFF (step S100: NO), the brake ECU 60 completes the BA processing routine without performing the assist control. When the assist control condition satisfaction flag FLG4 is ON (step S100: YES), the brake ECU 60 determines whether an increase completion flag FLG5 is OFF (step S101). When the increase completion flag FLG5 is ON (step S101: NO), the brake ECU 60 determines that the increasing control is completed and proceeds to step S107, which will be described below.

When the increase completion flag FLG5 is OFF (step S101: YES), the brake ECU 60 increments a sixth determination timer T6 by "1" (step S102). Subsequently, the brake ECU 60 determines whether of the deceleration correction value DVtp, the downshift determination correction value DVflat, and the gradient change correction value DVDGlow are all "0 (zero)" (step S103). If of the correction values DVtp, DVflat, and DVDGlow are all "0 (zero)" (step S103: YES), the brake ECU 60 performs a first increasing control (step S104). The first increasing control increases the braking force applied to the wheels FR, FL, RR, and RL at a first increasing speed. The brake ECU 60 determines whether the sixth determination timer T6 is greater than or equal to first determination time TBA1th (step S105). The first determination time TBA1th corresponds to an increase requisition time during which the assist control increases the braking force.

When the sixth determination timer T6 is less than the first determination time TBA1th (step S105: NO), the brake ECU 60 terminates the BA processing routine to continue the first increasing control. When the sixth determination timer T6 is greater than or equal to the first determination time TBA1th (step S105: YES), the brake ECU 60 sets the increase completion flag FLG5 to ON to indicate completion of the increasing control (step S106). That is, in the present embodiment, the sixth determination timer T6 corresponds to the time elapsed from when the increasing control is initiated. Subsequently, the brake ECU 60 performs the holding control for holding the braking force applied to the wheels FR, FL, RR, and RL (step S107) and terminates the BA processing routine.

When at least one of the correction values DVtp, DVflat and DVDGlow is not "0 (zero)" (step S103: YES), the first deceleration determination value DV_st has been corrected due to outer disturbance or interference. Thus, the brake ECU 60 determines that there is a possibility that the current assist control may have been executed in an unintended manner. Further, the brake ECU 60 performs a second increasing control in which an increasing speed of the braking force applied to the wheels FR, FL, RR, and RL is set to a second increasing speed that is slower than the first increasing speed (step S108). For example, the second increasing speed is about one half of the first increasing speed. In the second increasing control, the operating speed of the pump 49 may be decreased or the moving speed of a valve body of the linear solenoid valve 44 may be decreased as compared with the first increasing control.

Then, the brake ECU 60 determines whether the sixth determination timer T6 is greater than or equal to a second determination time TBA2th (step S109). The second determination time TBA2th is about two times the first determination time TBA1th, for example. The second determination time TBA2th corresponds to the increase requisition time when the second increasing control is executed. When the sixth determination timer T6 is less than the second determination time TBA2th (step S109: NO), the brake ECU 60 completes the BA processing routine to continue the second increasing control. When the sixth determination timer T6 is greater than or equal to the second determination time TBA2th (step S109: YES), the brake ECU 60 proceeds to step S106, which is described above. That is, the brake ECU 60 terminates the second increasing control and initiates the holding control. Accordingly, in the present embodiment, the brake ECU 60 also functions as an assist control unit that performs assist control. Steps 101 to 107 configure an assisting step.

Figure 14:
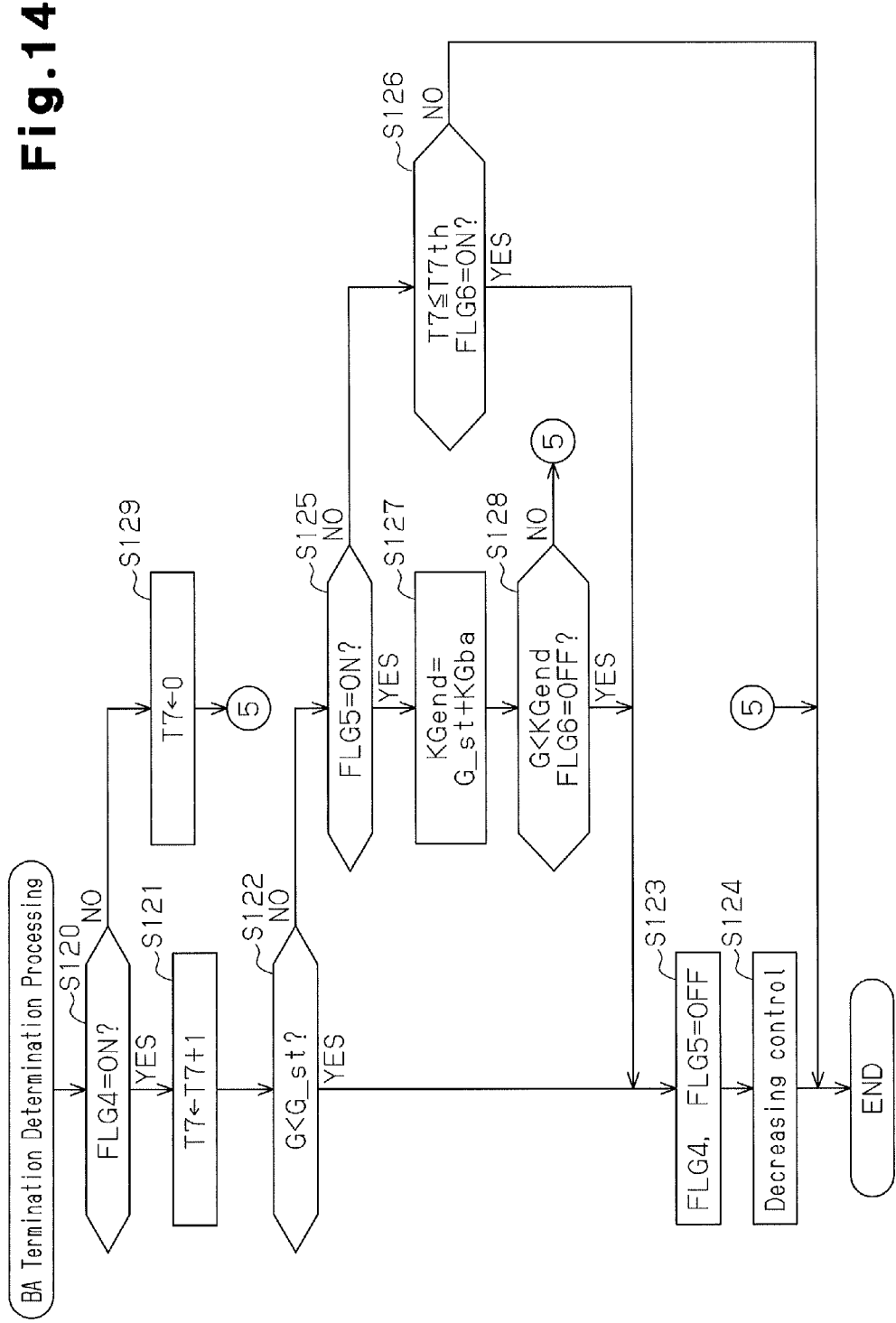
FIG. 14 is a flowchart illustrating a BA termination determination processing routine.

Next, a BA termination determination processing routine in step S16 will be described with reference to the flowchart shown in FIG. 14.

In the BA termination determination processing routine, the brake ECU 60 determines whether or not the assist control condition satisfaction flag FLG4 is ON (step S120). When the assist control condition satisfaction flag FLG4 is ON (step S120: YES), the assist control is being executed. Thus, the brake ECU 60 increments, by "1", a seventh determination timer T7 corresponding to the time elapsed from when the execution of the assist control is initiated (step S121). Subsequently, the brake ECU 60 determines whether the G sensor value G calculated in step S27 is less than the second deceleration determination value G_st, which is set in step S80 (step S122). When the G sensor value G is less than the second deceleration determination value G_st (step S122: YES), the brake ECU 60 determines that the termination condition of the assist control is satisfied. The brake ECU 60 sets the assist control condition satisfaction flag FLG4 and the increase completion flag FLG5 to OFF (step S123). Further, the brake ECU 60 performs decreasing control for decreasing the braking force applied to the wheels FR, FL, RR, and RL (step S124). Then, the brake ECU 60 terminates the BA termination determination processing routine.

When the G sensor value G is greater than or equal to the second deceleration determination value G_st (step S122: NO), the brake ECU 60 determines whether or not the increase completion flag FLG5 is ON (step S125). When the increase completion flag FLG5 is OFF (step S125: NO), the increasing control is being executed. Thus, the brake ECU 60 determines whether the following two conditions are satisfied (step S126).

(Seventh Condition) The seventh determination timer T7 is less than or equal to a termination determination time reference value T7th.

(Eighth Condition) An ABS flag FLG6 is ON.

The termination determination time reference value T7th is set to a shorter time than the increase requisition time, which is the execution time of the increasing control. More specifically, the termination determination time reference value T7th is set to one half or less of the increase requisition time, which is the execution time of the increasing control. When the first increasing control is executed, the termination determination time reference value T7th is set to a value (e.g., 34) corresponding to a time (e.g., 204 milliseconds) that is about one half the first increase requisition time (e.g., 500 milliseconds). When the second increasing control is executed, the termination determination time reference value T7th is set to a value (e.g., 68) corresponding to a time (e.g., 408 milliseconds) that is about one half the second increase requisition time (e.g., 1,000 milliseconds).

The ABS flag FLG6 is set to ON when the ABS control is being executed or the initiating condition of the ABS is satisfied. That is, when the ABS control is being executed or the initiating condition of the ABS control is satisfied, it is determined in step S126 whether the seventh determination timer T7 is less than or equal to the termination determination time reference value T7th.

When at least one of the seventh and eighth conditions is not satisfied (step S126: NO), the brake ECU 60 determines that the termination condition of the assist control is not satisfied and completes the BA termination determination processing routine. When the seventh and eighth conditions are both satisfied (step S126: YES), the brake ECU 60 determines that the ABS control has been initiated immediately after initiation of the assist control. In this case, the brake ECU 60 determines that a sufficiently large braking force can be applied to the wheels FR, FL, RR, and RL just with the driver's depression operation amount of the brake pedal 31. Hence, the brake ECU 60 determines that the termination condition of the assist control is satisfied and proceeds to step S123. Accordingly, in the present embodiment, the brake ECU 60 also functions as a termination determination unit that determines, during execution of the assist control, whether the termination condition of the assist control is satisfied based on at least one of the vehicle body deceleration (first estimated vehicle body deceleration) DV and the G sensor value (second estimated vehicle body deceleration) G. Step S126 corresponds to a termination determining step.

When the increase completion flag FLG5 is ON (step S125: YES), the holding control is being executed. Thus, the brake ECU 60 acquires a braking force amount ("assisting braking force amount", hereinafter) which is increased by the execution of the increasing control and applied to the wheels FR, FL, RR, and RL. Here, the brake ECU 60 estimates the assisting braking force amount based on the operation time and operation speed of the linear solenoid valve 44 and the pump 49. The brake ECU 60 adds an increase component value KGba, which corresponds to the assisting braking force amount, to the second deceleration determination value (braking force reference value) G_st, which is set in step S80, and sets the added result as a termination determination value (determination value) KGend (step S127). Further, the brake ECU 60 determines whether the following two conditions are satisfied (step S128).

(Ninth Condition) The G sensor value G is less than a termination determination value KGend.

(Tenth Condition) The ABS flag FLG6 is OFF.

When at least one of the ninth and tenth conditions is not satisfied (step S128: NO), the brake ECU 60 determines that the termination condition of the assist control is not satisfied and terminates the BA termination determination processing routine. When the ninth and tenth conditions are both satisfied (step S128: YES), the brake ECU 60 determines that the termination condition of the assist control is satisfied and proceeds to step S123. Accordingly, in the present embodiment, steps S127 and S128 configure a termination determination step.

When the assist control condition satisfaction flag FLG4 is OFF (step S120: NO), the brake ECU 60 determines that the assist control is not executed or the assist control has been terminated. The brake ECU 60 resets the seventh determination timer T7 to "0 (zero)" (step S129). Then, the brake ECU 60 terminates the BA termination determination processing routine.

Accordingly, the present embodiment has the advantages described below.

(1) Detection signals from the wheel speed sensors SE2 to SE5 are more easily affected by interference (i.e., outer disturbance) between the drive force transmitted to the wheels FR, FL, RR, and RL and the braking force than the detection signal from the vehicle body acceleration sensor SE6. The detection signals from the wheel speed sensors SE2 to SE5 are easily affected by the reaction force (i.e., outer disturbance) received by the wheels FR, FL, RR, and RL from the road surface along which the vehicle is traveling. If the first deceleration determination value DV_st is not corrected, a vehicle body deceleration DV that includes a vibration component based on outer disturbance easily exceeds the first deceleration determination value DV_st as compared with a vehicle body deceleration DV that does not include a vibration component. That is, there is a high probability that assist control will be initiated unintentionally.

Hence, in the present embodiment, when it is determined that a vibration component based on outer disturbance is included in the vehicle body deceleration DV, the first deceleration determination value DV_st is set to a value greater than that when it is determined that a vibration component based on outer disturbance is not included in the vehicle body deceleration DV. Thus, even if a vibration component based on outer disturbance is included in the vehicle body deceleration DV, the vehicle body deceleration DV does not easily exceed the first deceleration determination value DV_st. Accordingly, when an emergency braking operation is not being performed, the unintended initiation of the assist control can be prevented.

(2) When the acquired bad road index Nrw is greater than or equal to "1", it is determined that the road surface along which the vehicle is traveling is a bad road. In this case, the first deceleration determination value DV_st is set to a greater value than that when it is determined that the road surface is not a bad road. Thus, when the vehicle travels along a bad road, unintended initiation of the assist control can be prevented.

(3) In the present embodiment, a bad road determination correction value DVbad, which is used to correct the first deceleration determination value DV_st when the road surface is a bad road, is set to a larger value as the bad road index Nrw increases. This increases the determination accuracy of whether the current depression operation of the brake pedal 31 performed by a driver is an emergency braking operation.

(4) Even if the bad road index Nrw is "0 (zero)", a vibration component based on a reaction force received by the wheels FR, FL, RR, and RL from a road surface may be included in the vehicle body deceleration DV. Hence, in the present embodiment, when the bad road index Nrw is "0 (zero)", the first deceleration determination value DV_st is set to a greater value than the basic value KDV by the amplitude W_DV of the acquired vehicle body deceleration. Thus, even if a road surface along which the vehicle is traveling is not that uneven and not determined as being a bad road, unintended initiation of the assist control can be prevented.

(5) Detection signals from the wheel speed sensors SE2 to SE5 include fine cyclical changes (also referred to as "fluctuation") regardless of outer disturbance. Thus, the vehicle body deceleration DV calculated by using detection signals of the wheel speed sensors SE2 to SE5 also includes fine cyclical changes. Such fine cyclical changes are irrelevant with the influence of outer disturbance. Thus, there is no need to correct the first deceleration determination value DV_st based on fine cyclical changes. Hence, in the present embodiment, the amplitude reference value KW is set as a determination value for determining whether there is an influence of outer disturbance. When the amplitude W_DV of the acquired vehicle body deceleration is less than the amplitude reference value KW, the correction of the first deceleration determination value DV_st based on the amplitude W_DV is not performed. Therefore, when it is determined that there is almost no unevenness in the road surface, the assist control can be initiated at an appropriate timing.

(6) In the present embodiment, when the G sensor value G is greater than the sum of the vehicle body deceleration DV and the deceleration specified value DVth1 or when the vehicle body deceleration DV once becomes a negative value, it is determined that the vehicle moved over a bump. The first deceleration determination value DV_st is set to a value greater than the basic value KDV by the bump determination correction value DVstep (=KDVbad). Therefore, when the vehicle moves over a bump, initiation of unintended assist control can be restricted.

(7) Moreover, the bump determination correction value DVstep when determined that the vehicle moved over a bump is the same as the bad road determination correction value DVbad when the bad road index Nrw is determined as being "3". Hence, when the bad road correction flag FLG1 and the bump correction flag FLG2 are both set to ON, the first deceleration determination value DV_st is corrected based on the bump determination correction value DVstep. That is, the first deceleration determination value DV_st is corrected to a greater value. Accordingly, unintended initiation of the assist control can be prevented.

(8) When a signal indicating that the automatic transmission 21 is about be downshifted is received from the AT ECU 23, the first deceleration determination value DV_st is corrected, during the period (gear shifting specified time) corresponding to the gear shifting completion determination value KTd, to a value that is greater than that when a signal indicating that the automatic transmission 21 is about be downshifted is not received. This prevents the downshifting of the automatic transmission 21 from causing unintended initiation of the assist control.

(9) A vehicle has a characteristic in which when the driver depresses the brake pedal 31 when the vehicle is traveling, the vehicle starts to decelerate and may thereby cause downshifting of the automatic transmission 21. Thus, in the present embodiment, when it is not possible to communicate with the AT ECU 23, it is determined whether the driver's depression operation amount of the brake pedal 31 is large using the G sensor value G. If the third determination timer T3 corresponding to the duration time during which the G sensor value G remains to be the downshift determination value KGflat exceeds the first time T3_1, it is determined that the automatic transmission 21 may be downshifted. As a result, the first deceleration determination value DV_st is corrected to a value greater than that when it is not determined that there is a possibility that the downshifting operation is performed. This prevents the downshifting of the automatic transmission 21 from causing unintended initiation of the assist control.

(10) Immediately after the third determination timer T3 exceeds the first time T3_1, the probability of the automatic transmission 21 being actually downshifted is low, and assist control may actually become necessary. Here, if the downshift determination value KGflat is set to a maximum correction value KDVflat1 when the third determination timer T3 exceeds the first time T3_1, there is a possibility that the actually necessary assist control will not be executed. Hence, in the present embodiment, when the value of the third determination timer T3 is large, the first deceleration determination value DV_st is set to a value that is greater than that when the value of the third determination timer T3 is small. Thus, immediately after the third determination timer T3 exceeds the first time T3_1, the assist control can be properly initiated.

(11) In the present embodiment, the brake ECU 60 determines whether there is a probability of the automatic transmission 21 performing downshifting even when communication becomes impossible between the AT ECU 23 and the brake ECU 60. If it is determined that the automatic transmission 21 may undergo downshifting, the first deceleration determination value DV_st is corrected. Hence, even if a communication trouble occurs between the AT ECU 23 and the brake ECU 60, downshifting of the automatic transmission 21 is prevented from causing unintended initiation of the assist control.

(12) The present embodiment acquires a gradient estimated value Gslope of a road surface along which the vehicle is traveling. The first deceleration determination value DV_st is corrected based on the gradient estimated value Gslope. This suppresses variations in the initiation timing of the correcting control based on the gradient of the road surface.

(13) When the gradient of a road surface is a positive value, this indicates that the road surface is a sloped surface directed uphill. When the gradient of a road surface is a negative value, this indicates that the road surface is a sloped surface directed downhill. When the road is a sloped road directed uphill, gravity acting on the vehicle acts as a braking force applied to the vehicle. When the vehicle travels along a slope, a deceleration difference corresponding to the gradient of the road surface exists between vehicle body deceleration DV and the G sensor value G. Hence, in the present embodiment, when it is determined that the road is a sloped road directed uphill, the first deceleration determination value DV_st is set to a value that is greater than the basic value KDV, and the second deceleration determination value G_st is set to a value that is less than the basic value KGst. When it is determined that the road is a sloped road directed downhill, the first deceleration determination value DV_st is set to a value that is less than the basic value KDV, and the second deceleration determination value G_st is set to a value that is greater than the basic value KGst. This suppresses variations in the initiation timing of assist control caused by the gradient of the road surface.

(14) When a gradient of a road surface is changed and indicates an uphill slope, the braking force resulting from the change in the gradient of the road surface is applied to the front wheels FR and FL, and the wheel speeds VW of the front wheels FR and FL suddenly become slow. In contrast, the vehicle body speed VS of the vehicle is not decelerated as much as the wheel speeds VW of the front wheels FR and FL. Thus, the gradient change DDV of the vehicle body deceleration DV calculated by using detection signals of the wheel speed sensors SE2 to SE5 is deviated from the gradient change DG of the G sensor value G calculated by using a detection signal of the vehicle body acceleration sensor SE6. Hence, in the present embodiment, when the gradient change DG of the G sensor value is less than the gradient change reference value KDGlow, it is determined that the gradient of the road surface has changed and indicates an uphill slope. As a result, the gradient change correction value DVDGlow is set to a value that is greater than "0 (zero)". That is, the first deceleration determination value DV_st is corrected to a value greater than that when the gradient change DG of the G sensor value is greater than or equal to the gradient change reference value KDGlow, that is, greater than that when it is determined that the gradient of the road surface is not changed so as to indicate an uphill slope. This prevents the assist control from being initiated unintentionally when the gradient of the road surface changes thereby indicating an uphill slope.

(15) The gradient change reference value KDGlow is set to a value based on the difference between the gradient change DDV of vehicle body deceleration and the gradient change DG of the G sensor value. Hence, it is possible to increase the accuracy for determining whether or not the gradient of a road surface has changed thereby indicating an uphill slope.

(16) The assist control may be performed in an unintended manner when the first deceleration determination value DV_st is corrected based on at least one of the deceleration correction value DVtp, downshift determination correction value DVflat, and gradient change correction value DVDGlow. Hence, in the present embodiment, in the assist control performed when the first deceleration determination value DV_st is corrected based on at least one of the deceleration correction value DVtp, the downshift determination correction value DVflat, and the gradient change correction value DVDGlow, the increasing speed of the braking force applied to the wheels FR, FL, RR, and RL becomes slower than that for an assist control performed when the deceleration correction value DVtp, the downshift determination correction value DVflat, and the gradient change correction value DVDGlow are "0 (zero)". Thus, even if assist control is executed when it is determined that there is no need to perform the assist control, the driver of the vehicle is less likely to feel uncomfortable due to the execution of the assist control.

(17) During execution of the assist control, detection signals of the wheel speed sensors SE2 to SE5 and the vehicle body acceleration sensor SE6 are used to determine whether or not the termination condition of the assist control is satisfied. When the termination condition is satisfied, the assist control is terminated. Accordingly, even if the vehicle does not include a pressure sensor that detects the MC pressure in the master cylinder 321, the assist control can be completed at a proper timing.

(18) In the present embodiment, the termination determination value KGend is obtained by adding the increase component value KGba of the braking force based on execution of increasing control to the second deceleration determination value G_st, which is used for the termination determination of the assist control. During execution of the holding control, when the G sensor value G that once exceeded the second deceleration determination value G_st becomes less than the termination determination value KGend, the driver's depression operation amount of the brake pedal 31 is determined as being small, and the assist control is terminated. Accordingly, the assist control may be terminated when determined that the driver intends to decrease the deceleration of the vehicle.

(19) In the present embodiment, when the ABS control is initiated during execution of the holding control for the assist control, the holding control is continued. That is, the assist control is not terminated. Hence, the assist control is not terminated in an inadvertent manner against the driver's intentions.

(20) In the present embodiment, if the ABS control is initiated when the seventh determination timer T7 is less than or equal to the termination determination time reference value T7th during execution of the increasing control, it is determined that a sufficiently large braking force is applied to the wheels FR, FL, RR, and RL by the driver's depression operation of the brake pedal 31. Hence, the assist control is terminated. Accordingly, the assist control may be terminated at an appropriate timing.

(21) In the present embodiment, the gradient change DDV of the vehicle body deceleration when vehicle body deceleration DV becomes greater than or equal to the first deceleration determination value DV_st is acquired as a first gradient change DDV1. Then, when the G sensor value G becomes greater than or equal to the second deceleration reference value G_st, the gradient change DDV of the vehicle body deceleration that is calculated afterward is acquired as the second gradient change DDV2. When the second gradient change DDV2 is greater than or equal to the first gradient change DDV1, it is determined that the depression force produced when the driver depresses the brake pedal 31 is high. Therefore, even if the vehicle does not have a pressure sensor that detecting an MC pressure in the master cylinder 321, it can be determined whether the depression force produced when the driver depresses the brake pedal 31 is high.

(22) In some vehicles, the change in the G sensor value G based on the driver's depression operation of the brake pedal 31 is initiated at substantially the same time as when the vehicle body deceleration DV is started. Hence, in the present embodiment, a second gradient change DDV2 is acquired after the fifth determination timer T5, which is renewed after the first gradient change DDV1 is acquired, exceeds the specified waiting time KT_w. When the second gradient change DDV2 is greater than or equal to the first gradient change DDV1, it is determined that the depression force produced when the driver depresses the brake pedal 31 is high. Hence, it is possible to increase the accuracy for determining whether or not the depression force produced when the driver depresses the brake pedal 31 is high.

(23) In the present embodiment, even though the initiating condition of assist control is satisfied, if determined that the depression force produced when the driver depresses the brake pedal 31 is high, it is determined that assist control is unnecessary, and the assist control is not started. Accordingly, a case in which the assist control is executed unintentionally can be avoided.

Second Embodiment

A second embodiment of the present invention will now be described with reference to FIGS. 20 and 21. The second embodiment differs from the first embodiment in that the initiation time determination reference value KT2 is changed by the load of the vehicle. Accordingly, the difference will mainly be described hereafter, and like or same reference numerals are given to those components that are the same as the corresponding components of the first embodiment. Such components will not be described.

The load of a vehicle changes in accordance with the number of occupants in the vehicle and the cargo carried by the vehicle. When the load of the vehicle changes, the characteristics of the vehicle also change. Specifically, when the driver depresses the brake pedal 31, the G sensor value G, which is calculated by using a detection signal of the vehicle body acceleration sensor SE6, changes following, in a slightly delayed manner, the vehicle body deceleration DV, which is calculated by using a detection signals of the wheel speed sensors SE2 to SE5. However, the timing at which the G sensor value G starts to change due to the driver's depression operation of the brake pedal 31 is delayed when the load is heavy from that when the load is light.

Hence, when the initiation time determination reference value KT2 (see step S89 in FIG. 12), which is used to determine the initiation timing of the assist control, is constant, the G sensor value G exceeds the second deceleration determination value G_st after the fifth determination timer T5 exceeds the initiation time determination reference value KT2. In this case, the initiating condition of the assist control is not satisfied. Thus, the assist control is not initiated.

The braking control processing routine of the present embodiment includes an initiation time determination reference value setting processing that sets the initiation time determination reference value KT2 to a value corresponding to the load of the vehicle. The initiation time determination reference value setting processing routine will now be described with reference to the flowchart shown in FIG. 20 and the map shown in FIG. 21.

In the initiation time determination reference value setting processing routine, the brake ECU 60 determines whether the brake switch SW1 is OFF (step S140). When the brake switch SW1 is ON (step S140: NO), the driver is depressing a brake pedal 31. Thus, the brake ECU 60 terminates the initiation time determination reference value setting processing routine.

When the brake switch SW1 is OFF (step S140: YES), the driver is not depressing the brake pedal 31. Thus, the brake ECU 60 acquires the drive force ET transmitted to the front wheels FR and FL, which are the drive wheels (step S141). For example, the brake ECU 60 acquires the drive force generated by the engine 12 from the engine ECU 13 and the gear position of the automatic transmission 21 from the AT ECU 23. Then, the brake ECU 60 calculates the drive force ET transmitted to the front wheels FR and FL based on the acquired drive force generated in the engine 12 and the gear position of the automatic transmission 21. Accordingly, in the present embodiment, the brake ECU 60 also functions as a drive force acquisition unit, which acquires the drive force ET applied to the front wheels FR and FL, based on the driving operation of the engine 12.

Subsequently, the brake ECU 60 estimates a load WW of the vehicle (step S142). When the load WW of the vehicle is constant, the acceleration of the vehicle corresponds to the drive force ET to the front wheels FR and FL. In other words, when the drive force ET transmitted to the front wheels FR and FL is constant, the acceleration of the vehicle, namely, the G sensor value G decreases as the load WW of the vehicle becomes heavier.

Therefore, the brake ECU 60 acquires the reference value Gbase for the G sensor value corresponding to the drive force ET acquired in step S141. The reference value Gbase is a theoretical value of the G sensor value under the assumption that there is no occupant and cargo in the vehicle. The brake ECU 60 acquires, as an acceleration difference, the difference ($=|G-Gbase|$) between the G sensor value G calculated in step S28 and the reference value Gbase. Subsequently, the brake ECU 60 acquires the load WW of the vehicle corresponding to the acquired acceleration difference using a third map shown in FIG. 21.

The third map is used to acquire the load WW of the vehicle corresponding to the acceleration difference. As shown in FIG. 21, the vertical axis of the third map shows the acceleration difference ($=|G-Gbase|$), and the horizontal axis shows the load WW of the vehicle. When the acceleration difference is less than or equal to a first difference $\Delta G1$, the load WW of the vehicle is determined as being "0 (zero)". If the acceleration difference exceeds the first difference $\Delta G1$, an increase in the acceleration difference indicates a larger load WW of the vehicle. Accordingly, in the present embodiment, the brake ECU 60 also functions as a load acquisition unit. Step S142 corresponds to a load acquiring step.

Figure 20:
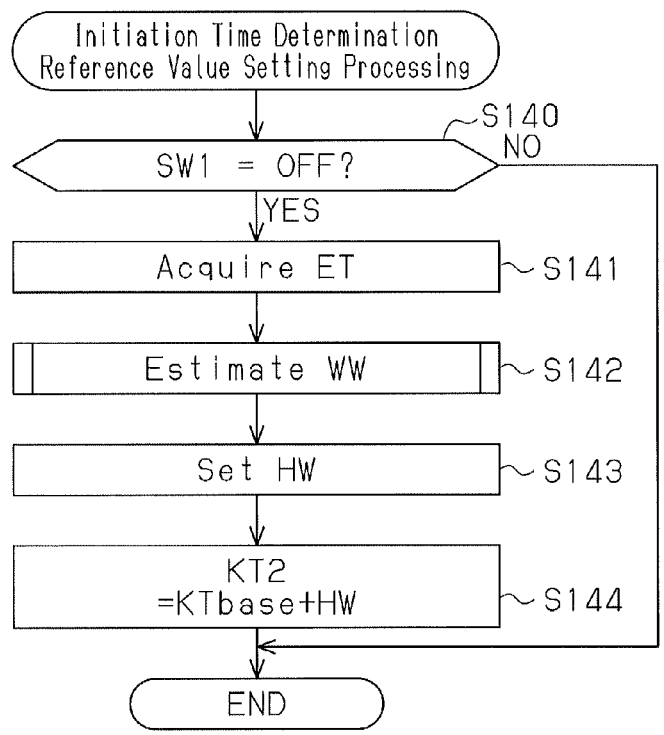
FIG. 20 is a flowchart illustrating an initiation time determination reference value setting processing routine.
Figure 21:
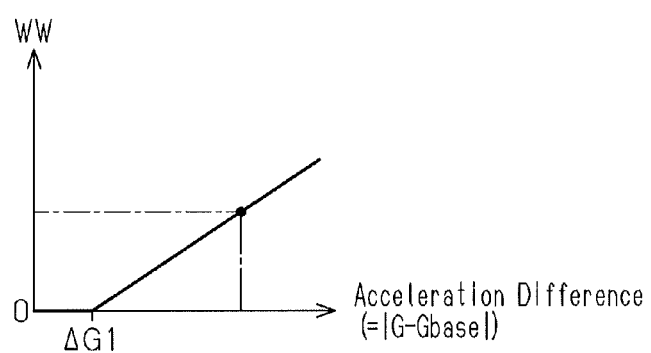
FIG. 21 is a map for estimating the load on a vehicle.

Returning to the flowchart shown in FIG. 20, the brake ECU 60 sets a load correction value HW based on the load WW of the vehicle, which is estimated in step S142 (step S143). As the load WW of the vehicle becomes heavier, the delay when the G sensor value G starts to change becomes greater. Thus, in step S143, if the load WW of the vehicle is heavy, the load correction value HW is set to a larger value than when the load WW is light using a predetermined arithmetic expression. Here, if the load WW of the vehicle is "0 (zero)", the load correction value HW is set to "0 (zero)".

Subsequently, the brake ECU 60 adds the load correction value HW, which is set in step S143, to a preset base value KTbase, and the addition result is set as a initiation time determination reference value KT2 (step S144). Accordingly, in the present embodiment, the brake ECU 60 also functions as an initiation time setting unit. When the load WW of the vehicle is heavy, the initiation time setting unit sets the initiation time determination reference value KT2 to a larger value than when the load WW is light. Step S144 corresponds to a start time setting step. Thereafter, the brake ECU 60 completes the initiation time determination reference value setting processing routine.

Accordingly, in the present embodiment, the advantages described below can be obtained in addition to advantages (1) to (23) of the first embodiment.

(24) The initiation time determination reference value KT2 is set to a value corresponding to the load WW of the vehicle. This improves the determination accuracy of step S89. Accordingly, when assist control is necessary, the assist control can be properly initiated.

(25) When the load WW of the vehicle is estimated, the G sensor value G and the drive force ET transmitted to the front wheels FR and FL, which are drive wheels, are used when a braking operation is not performed. Thus, there is no need to separately provide a sensor that detects the load WW of the vehicle, and the weight of the vehicle can be estimated.

The above embodiments may be modified to the embodiments described below.

In the above embodiments, the determination processing of step S103 may be omitted. In this case, the increasing control of the assist control is set to the first increasing control irrespective of correction of the first deceleration determination value DV_st.

A vibration component included in the vehicle body deceleration DV when the automatic transmission 21 is downshifted becomes greater as the vehicle body speed VS increases. Hence, the downshift determination correction value DVflat may be increased as the vehicle body speed VS increases. This lowers the possibility of the assist control being executed unintentionally when the automatic transmission 21 is downshifted as the vehicle travels at a high speed.

In each embodiment, when it is determined that the automatic transmission 21 may be downshifted, the downshift determination correction value DVflat may be set to a preset predetermined value irrespective of the value of the third determination timer T3.

In each embodiment, the processing operations of steps S66 to S69 may be omitted. This can also correct the first deceleration determination value DV_st by receiving a downshift signal from the AT ECU 23.

In each embodiment, if the vehicle cannot receive information related to the downshifting of the transmission like when the transmission of the vehicle is a manual transmission, the processing operations of steps S57 to S65 may be omitted. In this case, the determination processing in step S66 is executed after the processing operations of step S52 and step S56.

In each embodiment, when the transmission of the vehicle is a continuously variable automatic transmission, a vibration component based on outer disturbance caused by a downshifting operation of the automatic transmission included in the vehicle body deceleration DV is subtle. Hence, the processing operations in steps S57 to S69 may be omitted.

In each embodiment, the first deceleration determination value DV_st does not have to be corrected based on the bump determination correction value DVstep.

In each embodiment, the bump determination correction value DVstep does not have to be set to "0 (zero)" in step S51. In this case, the bump correction flag FLG2 is also set to OFF in step S52. Thus, correction of the first deceleration determination value DV_st based on the bump determination correction value DVstep is not performed.

In each embodiment, the bump determination correction value DVstep may be set to a value greater than the third correction value KDVbad3 in step S55.

Further, the bump determination correction value DVstep may be set to a value less than the third correction value KDVbad3. In this case, however, if the bad road correction flag FLG1 is ON, the first deceleration determination value DV_st may be corrected based on the bad road determination correction value DVbad.

In each embodiment, the second time determination value T2th may be decreased as the vehicle body speed VS increases. This is because an increase in the vehicle body speed VS shortens the time required for the vehicle to move past a bump. An estimated time from when the front wheels FR and FL of the vehicle move over a bump to when the rear wheels RR and RL pass by the bump may be calculated based on the vehicle body speed VS and the wheel base length of the vehicle, and the estimated time may be set as the second time determination value T2th.

In each embodiment, the determination processing in step S46 may be omitted. If the first deceleration determination value DV_st is corrected based on the amplitude W_DV when the downshift determination correction value DVflat and the gradient change correction value DVDGlow are "0 (zero)", the first increasing control may be performed when the initiating condition of the assist control is satisfied.

In each embodiment, the amplitude W_DV of the vehicle body deceleration DV when the bad road index Nrw is "0 (zero)" does not have to be calculated. That is, the correction of the first deceleration determination value DV_st based on the amplitude W_DV does not have to be performed.

In each embodiment, step S31 may be omitted. Even in this case, the bad road correction flag FLG1 is set to OFF in step S32. Thus, the first deceleration determination value DV_st is not corrected based on the bad road determination correction value DVbad.

In each embodiment, the first deceleration determination value DV_st does not have to be corrected based on the bad road index Nrw. In this case, the first deceleration determination value DV_st can be corrected by the amplitude W_DV of the vehicle body deceleration DV.

In each embodiment, a vertical acceleration sensor for detecting the vertical acceleration of the vehicle may be provided in the vehicle. Further, the bad road index Nrw of a road surface may be calculated based on changes in the vertical acceleration, which is based on the detection signal from the vertical acceleration sensor.

In each embodiment, the gradient change reference value KDGlow may be a predetermined value that is preset through an experiment or a simulation. In this case, the second map shown in FIG. 7 is not necessary.

In each embodiment, the first deceleration determination value DV_st may not be corrected based on the gradient change correction value DVDGlow.

In each embodiment, the gradient estimated value Gslope may be set based on the difference between the vehicle body deceleration DV and the G sensor value G when a driver starts depressing the brake pedal 31. In this case, the first deceleration determination value DV_st and the second deceleration determination value G_st may be readily corrected in accordance with the gradient of the road surface.

However, in this correction method, the correction accuracy is low as compared with each of the above embodiments. Hence, before the gradient estimated value Gslope is acquired by the method of any of the above embodiments, the first deceleration determination value DV_st and the second deceleration determination value G_st are corrected based on the difference between the vehicle body deceleration DV and the G sensor value G when the depression operation of the brake pedal 31 is started. After the gradient estimated value Gslope is acquired by the method of any of the above embodiments, the first deceleration determination value DV_st and the second deceleration determination value G_st may be corrected based on the gradient estimated value Gslope.

In each embodiment, when gradients of road surfaces along which the vehicle travels are stored in a navigation device (not shown) of the vehicle, the gradient of the road surface may be acquired from the navigation device. Further, the first deceleration determination value DV_st and the second deceleration determination value G_st may be corrected based on the gradient.

In each embodiment, the second deceleration determination value G_st does not have to be corrected based on the gradient estimated value Gslope.

In each embodiment, in step S126, instead of determining whether or not the ABS flag FLG6 is ON, it may be determined whether or not the vehicle body deceleration DV is greater than or equal to the deceleration corresponding to the road surface limit (e.g., 1.2 G).

In each embodiment, in step S126, it may be determined whether or not the ABS control has been initiated during execution of increasing control. In this case, the termination determination time reference value T7th becomes a value corresponding to the first increase requisition time (or second increase requisition time).

In each embodiment, the determination processing of step S126 may be omitted.

In each embodiment, in step S128, it may be determined only whether or not the G sensor value G is less than the termination determination value KGend. In this case, if the G sensor value G is less than the termination determination value KGend, the assist control is terminated irrespective of whether ABS control is executed.

In each embodiment, the termination determination value KGend is a sum of the second deceleration determination value G_st and the increase component value KGba. That is, the second deceleration determination value G_st corresponds to a braking force reference value. However, the braking force reference value may differ from the second deceleration determination value G_st.

In each embodiment, the determination processing in step S122 may be omitted. In this case, the determination processing of step S125 is performed after the processing of step S121 is executed.

In each embodiment, the processing operations of steps S127 and S128 may be omitted. In this case, the assist control may be terminated when the brake switch SW is turned OFF.

In each embodiment, among the two conditions of step S89, the sixth condition may be "the fifth determination timer T5 is less than or equal to the initiation time determination reference value KT2". In this manner, the specified waiting time KT_w is not necessary.

In each embodiment, when the initiating condition for the assist control is satisfied, the assist control may be performed irrespective of the magnitude of the depression force produced when the driver depresses the brake pedal 31. In this case, the processing operations in steps S86 and S90 may be omitted.

Some vehicles are provided with detection sensors that detect the number of occupants in the vehicle. In such a vehicle, the number of occupants may be acquired based on the detection signal from the detection sensor, and the load WW may be estimated based on the number of occupants.

In the second embodiment, the load WW of the vehicle is estimated by reading the state when the vehicle is traveling. However, the present invention is not limited in such a manner, and the load WW may be acquired by reading load data that is input when the vehicle is manufactured or load data that is input after the vehicle is manufactured.

In the second embodiment, the first deceleration determination value DV_st and the second deceleration determination value G_st may be predetermined values.

In each embodiment, the vehicle may be a rear wheel drive vehicle, in which the rear wheels RR and RL are the drive wheels, or a four wheel drive vehicle, in which the wheels FR, FL, RR, and RL are all drive wheels.

In each embodiment, the power source of the vehicle may be a motor.

The present invention may be embodied in a braking control device for a vehicle provided with a pressure sensor that detects the MC pressure in the master cylinder 321. The braking control processing shown in FIG. 8 may be executed when a failure occurs in the pressure sensor.

The invention claimed is:

1. A braking control device for a vehicle comprising:
   a first deceleration calculation unit that calculates a first estimated vehicle body deceleration by using a detection signal of a wheel speed sensor arranged on the vehicle;
   a second deceleration calculation unit that calculates a second estimated vehicle body deceleration by using a detection signal of a vehicle body acceleration sensor arranged on the vehicle;
   an assist control unit that, during operation of a brake pedal of a vehicle, initiates an assist control, which assists in increasing a braking force applied to a wheel of the vehicle, when the time elapsed from when the first estimated vehicle body deceleration has exceeded a first deceleration determination value is less than or equal to a set initiation time determination reference value and the second estimated vehicle body deceleration exceeds a second deceleration determination value;
   a load acquisition unit that acquires a load of the vehicle; and
   an initiation time setting unit that sets the initiation time determination reference value to a larger value when the load of the vehicle is heavy than when the load is light.

2. The braking control device for a vehicle according to claim 1, further comprising a drive force acquisition unit that acquires a drive force applied to the wheel based on driving operation of a drive source of the vehicle,
   wherein the load acquisition unit estimates the load of the vehicle based on the drive force acquired when the braking operation is not performed and the second estimated vehicle body deceleration.

* * * * *